(12) United States Patent
Li et al.

(10) Patent No.: US 12,369,055 B2
(45) Date of Patent: Jul. 22, 2025

(54) METHOD FOR MEASUREMENT ON CARRIER, TERMINAL DEVICE, AND NETWORK DEVICE

(71) Applicant: HUAWEI TECHNOLOGIES CO., LTD., Guangdong (CN)

(72) Inventors: Hong Li, Beijing (CN); Meng Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 403 days.

(21) Appl. No.: 17/069,318

(22) Filed: Oct. 13, 2020

(65) Prior Publication Data

US 2021/0029566 A1 Jan. 28, 2021

Related U.S. Application Data

(63) Continuation of application No. PCT/CN2019/082511, filed on Apr. 12, 2019.

(30) Foreign Application Priority Data

Apr. 13, 2018 (CN) .......................... 201810331178.2
Jun. 22, 2018 (CN) .......................... 201810654017.7

(51) Int. Cl.
*H04W 24/08* (2009.01)

(52) U.S. Cl.
CPC .................................. *H04W 24/08* (2013.01)

(58) Field of Classification Search
CPC .................................................. H04W 24/08
See application file for complete search history.

(56) References Cited

U.S. PATENT DOCUMENTS

2017/0257785 A1 9/2017 Henttonen et al.

FOREIGN PATENT DOCUMENTS

| CN | 102461254 A | 5/2012 |
|----|-------------|--------|
| CN | 103220702 A | 7/2013 |
| CN | 106792786 A | 5/2017 |

(Continued)

OTHER PUBLICATIONS

3GPP TS 38.133 V15.1.0 (Mar. 2018), "3rd Generation Partnership Project; Technical Specification Group Radio Access Network; NR; Requirements for support of radio resource management (Release 15)," Mar. 2018, 59 pages.

(Continued)

*Primary Examiner* — Abdeltif Ajid
(74) *Attorney, Agent, or Firm* — Fish & Richardson P.C.

(57) ABSTRACT

This application provides methods, terminal devices, and network devices for measurement on a carrier. One method includes: determining, by a terminal device, a measurement requirement on a frequency carrier based on a maximum quantity of colliding carriers that collide with the frequency carrier, wherein the maximum quantity of colliding carriers is determined based on a measurement gap and a measurement window of the frequency carrier, wherein the measurement gap indicates a length of time between two measurements of one or more carriers that comprise the frequency carrier; and performing, by the terminal device, measurement on the frequency carrier based on the measurement requirement.

18 Claims, 13 Drawing Sheets

200

A terminal device determines a measurement requirement on a first carrier based on at least one of an average measurement probability on the first carrier, a minimum measurement probability on the first carrier, and a maximum quantity of colliding carriers that collide with the first carrier, where the at least one of the average measurement probability, the minimum measurement probability, and the maximum quantity of colliding carriers is determined based on a measurement gap and a measurement window of the first carrier, and the measurement gap is a measurement gap used at least for the first carrier — S230

The terminal device performs measurement on the first carrier based on the measurement requirement — S240

(56) References Cited

FOREIGN PATENT DOCUMENTS

WO          2016161657 A1    10/2016
WO       WO-2019141231 A1 *   7/2019   .......... H04W 24/00

OTHER PUBLICATIONS

Huawei et al., "Discussion on SSB based inter-frequency measurement requirements," 3GPP TSG-RAN WG4 Meeting #86, R4-1802637, Athens, Greece, Feb. 26-Mar. 2, 2018, 3 pages.
PCT International Search Report and Written Opinion issued in International Application No. PCT/CN2019/082511 on Jul. 1, 2019, 17 pages (with English translation).
Huawei et al., "Discussion on inter-frequency SMTC overlapping," 3GPP TSG-RAN WG4 Meeting #86bis, R4-1804779, Melbourne, Australia, Apr. 16-20, 2018, 4 pages.
Huawei, et al., "Way forward on SSB-based inter-frequency measurement requirements," 3GPP TSG-RAN WG4 Meeting #86bis, R4-1804748, Melbourne, Australia, Apr. 16-20, 2018, 4 pages.
Huawei et al., "Discussion on the impacts of the methodology of defining NR inter-frequency measurement requirements," 3GPP TSG-RAN WG4 Meeting #87, R4-1807276, Busan, Korea, May 21-25, 2018, 6 pages.
Extended European Search Report in European Application No. 19784443.4, dated Apr. 15, 2021, 14 pages.
Office Action issued in Chinese Application No. 201810654017.7 on Aug. 5, 2022, 7 pages.

* cited by examiner

200

| A terminal device determines a measurement requirement on a first carrier based on at least one of an average measurement probability on the first carrier, a minimum measurement probability on the first carrier, and a maximum quantity of colliding carriers that collide with the first carrier, where the at least one of the average measurement probability, the minimum measurement probability, and the maximum quantity of colliding carriers is determined based on a measurement gap and a measurement window of the first carrier, and the measurement gap is a measurement gap used at least for the first carrier | S230 |

| The terminal device performs measurement on the first carrier based on the measurement requirement | S240 |

A network device receives a measurement result on a first carrier, where the measurement result on the first carrier is determined based on a measurement requirement on the first carrier, where the measurement requirement on the first carrier is determined based on at least one of an average measurement probability on the first carrier, a minimum measurement probability on the first carrier, and a maximum quantity of colliding carriers that collide with the first carrier, the at least one of the average measurement probability on the first carrier, the minimum measurement probability on the first carrier, and the maximum quantity of colliding carriers that collide with the first carrier is determined based on a measurement gap and a measurement window of the first carrier, and the measurement gap is a measurement gap used at least for the first carrier  ⎯ S310

The network device configures the first carrier based on the measurement result  ⎯ S320

FIG. 11

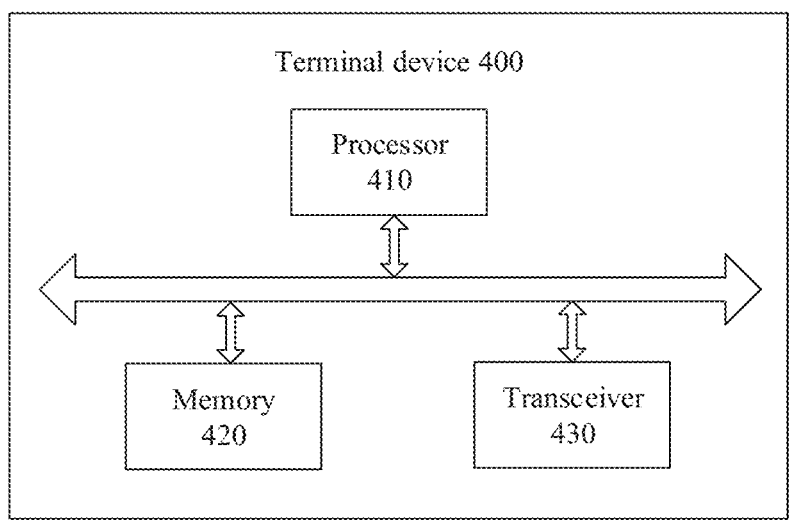

FIG. 12

METHOD FOR MEASUREMENT ON CARRIER, TERMINAL DEVICE, AND NETWORK DEVICE

CROSS-REFERENCE TO RELATED APPLICATIONS

This application is a continuation of International Application No. PCT/CN2019/082511, filed on Apr. 12, 2019, which claims priority to Chinese Patent Application No. 201810331178.2, filed on Apr. 13, 2018 and Chinese Patent Application No. 201810654017.7, filed on Jun. 22, 2018. The disclosures of the aforementioned applications are hereby incorporated by reference in their entireties.

TECHNICAL FIELD

This application relates to the communications field, and more specifically, to a method for measurement on a carrier, a terminal device, and a network device.

BACKGROUND

A terminal device that supports communication in the new radio (new radio, NR) standard needs to perform cell identification and measurement on a carrier. For example, the terminal device searches for and detects a synchronization signal block (Synchronization Signal Block, SSB) of a cell on a carrier, to obtain a physical cell identifier, timing information, an SSB-based measurement result, and the like of the cell.

A network device configures corresponding reference signal configuration information for each carrier, to notify a terminal device of information such as a period of a reference signal on the carrier. The network device configures a uniform measurement gap pattern for all carriers on which detection needs to be performed by the terminal device. The terminal device may perform, based on information included in the measurement gap pattern, for example, in a measurement gap included in the measurement gap pattern, a cell identification operation, a cell measurement operation, or another operation on all the carriers on which detection needs to be performed. Currently, a terminal device needs to perform, based on a measurement counter stipulated in a protocol, measurement on all carriers on which detection needs to be performed. However, in the fifth generation mobile communications technology (5th-Generation, 5G), no definition related to the measurement counter is provided. Consequently, an error may occur in a process in which the terminal device performs measurement on a plurality of carriers, affecting normal communication.

SUMMARY

This application provides a method for measurement on a carrier, a terminal device, and a network device. A measurement counter on each carrier on which measurement needs to be performed may be defined based on each piece of measurement configuration information related to the carrier. Fairness and competitiveness of measurement opportunities on different carriers are considered. A measurement delay is reduced. In addition, a requirement on a measurement capability of the terminal device is prevented from being excessively high, costs of the terminal device are reduced, and user experience is improved.

According to a first aspect, a method for measurement on a carrier is provided. The method includes: determining, by a terminal device, a measurement requirement on a first carrier based on an average measurement probability and/or a minimum measurement probability on the first carrier, where the average measurement probability and/or the minimum measurement probability are/is determined based on a measurement gap and a measurement window of the first carrier, and the measurement gap is a measurement gap used at least for the first carrier; and performing, by the terminal device, measurement on the first carrier based on the measurement requirement.

According to the method for measurement on a carrier that is provided in the first aspect, for each carrier on which measurement needs to be performed by the terminal device, a measurement requirement (a measurement counter) on the carrier on which measurement is to be performed is determined based on an average measurement probability and/or a minimum measurement probability on the carrier (the first carrier) on which measurement is to be performed. The average measurement probability and/or the minimum measurement probability are/is determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. A measurement delay of the terminal device can be reduced on the basis that a measurement opportunity on each carrier is fully considered. In addition, a requirement on a measurement capability of the terminal device is prevented from being excessively high, costs of the terminal device are reduced, normal communication of the terminal device is ensured, and user experience is improved.

In a possible implementation of the first aspect, the average measurement probability and/or the minimum measurement probability are/is determined based on the measurement gap and a measurement window of each carrier in one or more carriers, the measurement gap is a measurement gap applied to the one or more carriers, and the one or more carriers include the first carrier.

In a possible implementation of the first aspect, the method further includes: determining, by the terminal device, a set of one or more measurement gaps in which one or more measurement windows of the first carrier are located; and determining, by the terminal device, the average measurement probability and/or the minimum measurement probability on the first carrier in the set.

In a possible implementation of the first aspect, the determining, by the terminal device, the average measurement probability and/or the minimum measurement probability on the first carrier in the set includes: determining, by the terminal device, a measurement probability on the first carrier in each measurement gap in the set; and determining, by the terminal device, the average measurement probability and/or the minimum measurement probability on the first carrier in the set based on the measurement probability on the first carrier in each measurement gap.

In a possible implementation of the first aspect, the determining, by the terminal device, a measurement probability on the first carrier in each measurement gap in the set includes: determining, by the terminal device, a quantity of colliding carriers in each measurement gap in the set; and determining, by the terminal device, the measurement probability on the first carrier in each measurement gap in the set based on the quantity of colliding carriers in each measurement gap.

In a possible implementation of the first aspect, the quantity of colliding carriers includes a total quantity of carrier(s) that collide with the measurement window of the first carrier in one measurement gap in the set.

In a possible implementation of the first aspect, the collision includes: a part or all of the measurement window of the first carrier and a part or all of a measurement window of at least one carrier are in one measurement gap in the set.

In a possible implementation of the first aspect, the measurement window includes one or more of a start position of the measurement window, duration of the measurement window, and a period of the measurement window; and/or the measurement gap includes one or more of a start position of the measurement gap, duration of the measurement gap, and a period of the measurement gap.

In a possible implementation of the first aspect, the determining, by a terminal device, a measurement requirement on a first carrier based on an average measurement probability and/or a minimum measurement probability on the first carrier includes: determining, by the terminal device, a first parameter of the first carrier based on the average measurement probability and/or the minimum measurement probability on the first carrier; and determining, by the terminal device, the measurement requirement based on the first parameter.

In a possible implementation of the first aspect, the determining, by the terminal device, a first parameter of the first carrier based on the average measurement probability and/or the minimum measurement probability on the first carrier includes: determining, by the terminal device, a reciprocal of the average measurement probability or a reciprocal of the minimum measurement probability on the first carrier as the first parameter.

In a possible implementation of the first aspect, the determining, by the terminal device, the measurement requirement based on the first parameter includes: determining the measurement requirement according to the following formula:

$$S=\text{Max}(T1,T2)*[R*A]$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

In a possible implementation of the first aspect, the determining, by the terminal device, the measurement requirement based on the first parameter includes: determining the measurement requirement according to the following formula:

$$S=R*\text{Max}(T1,T2)*[A]$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

In a possible implementation of the first aspect, the determining, by the terminal device, the measurement requirement based on the first parameter includes: determining the measurement requirement according to the following formula:

$$S=R*\text{Max}(T1,T2)*A$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

In a possible implementation of the first aspect, the determining, by the terminal device, the measurement requirement based on the first parameter includes: determining the measurement requirement according to the following formula:

$$S=\text{Max}(T1,T2)*[R*A]*C$$

where S is a value of a measurement counter of the measurement requirement, R is a quantity of measurement opportunities that corresponds to the measurement requirement, C is a coefficient, T1 is the period of the measurement window, T2 is the period of the measurement gap, a value of Max(T1, T2) is a larger value of T1 and T2, and A is the first parameter.

In a possible implementation of the first aspect, the determining, by the terminal device, the measurement requirement based on the first parameter includes: determining the measurement requirement according to the following formula:

$$S=R*\text{Max}(T1,T2)*[A]*E$$

where S is a value of a measurement counter of the measurement requirement, R is a quantity of measurement opportunities that corresponds to the measurement requirement, E is a coefficient, T1 is the period of the measurement window, T2 is the period of the measurement gap, a value of Max(T1, T2) is a larger value of T1 and T2, and A is the first parameter.

In a possible implementation of the first aspect, the determining, by the terminal device, the measurement requirement based on the first parameter includes: determining the measurement requirement according to the following formula:

$$S=R*\text{Max}(T1,T2)*A*N$$

where S is a value of a measurement counter of the measurement requirement, R is a quantity of measurement opportunities that corresponds to the measurement requirement, N is a coefficient, T1 is the period of the measurement window, T2 is the period of the measurement gap, a value of Max(T1, T2) is a larger value of T1 and T2, and A is the first parameter.

In a possible implementation of the first aspect, the determining, by the terminal device, the measurement requirement based on the first parameter includes: determining the measurement requirement according to the following formula:

$$S=H*A$$

where S is a value of a measurement counter of the measurement requirement. H is a constant, and A is the first parameter.

In a possible implementation of the first aspect, the measurement window of the first carrier is a measurement window of a synchronization signal block SSB on the first carrier, and the measurement gap is a measurement gap used at least for the SSB on the first carrier.

According to a second aspect, a method for measurement on a carrier is provided. The method includes: receiving, by a network device, a measurement result on a first carrier, where the measurement result on the first carrier is determined based on a measurement requirement on the first carrier, where the measurement requirement on the first carrier is determined based on an average measurement probability and/or a minimum measurement probability on the first carrier, the average measurement probability and/or the minimum measurement probability on the first carrier are/is determined based on a measurement gap and a measurement window of the first carrier, and the measurement gap is a measurement gap used at least for the first carrier; and configuring, by the network device, the first carrier based on the measurement result.

According to the method for measurement on a carrier that is provided in the second aspect, for each carrier on which measurement is to be performed, a measurement requirement (a measurement counter) on the carrier on which measurement is to be performed is determined based on an average measurement probability and/or a minimum measurement probability on the carrier (the first carrier) on which measurement is to be performed. The average measurement probability and/or the minimum measurement probability are/is determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. The measurement result determined based on the measurement requirement can reflect a difference between carriers, so that the network device can more accurately configure different carriers based on measurement results on the different carriers, thereby improving communication efficiency and user experience.

In a possible implementation of the second aspect, the average measurement probability and/or the minimum measurement probability are/is determined based on the measurement gap and a measurement window of each carrier in one or more carriers, the measurement gap is a measurement gap applied to the one or more carriers, and the one or more carriers include the first carrier.

In a possible implementation of the second aspect, the measurement window of the first carrier is a measurement window of a synchronization signal block SSB on the first carrier, and the measurement gap is a measurement gap used at least for the SSB on the first carrier.

According to a third aspect, a method for measurement on a carrier is provided. The method includes: determining, by a terminal device, a measurement requirement on a first carrier based on a maximum quantity of colliding carriers that collide with the first carrier, where the maximum quantity of colliding carriers is determined based on a measurement gap and a measurement window of the first carrier, and the measurement gap is a measurement gap used at least for the first carrier; and performing, by the terminal device, measurement on the first carrier based on the measurement requirement.

According to the method for measurement on a carrier that is provided in the third aspect, for each carrier on which measurement needs to be performed by the terminal device, a measurement requirement (a measurement counter) on the carrier on which measurement is to be performed is determined based on the maximum quantity of colliding carriers that collide with the first carrier. At least one of the maximum quantity of colliding carriers that collide with the first carrier is determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. A measurement delay of the terminal device can be reduced on the basis that a measurement opportunity on each carrier is fully considered. In addition, a requirement on a measurement capability of the terminal device is prevented from being excessively high, costs of the terminal device are reduced, normal communication of the terminal device is ensured, and user experience is improved.

In a possible implementation of the third aspect, the maximum quantity of colliding carriers is determined based on the measurement gap and a measurement window of each carrier in one or more carriers, the measurement gap is a measurement gap applied to the one or more carriers, and the one or more carriers include the first carrier.

In a possible implementation of the third aspect, the method further includes: determining, by the terminal device, a set of one or more measurement gaps in which one or more measurement windows of the first carrier are located; and determining, by the terminal device, the maximum quantity of colliding carriers in the set.

In a possible implementation of the third aspect, the determining, by the terminal device, the maximum quantity of colliding carriers in the set includes: determining, by the terminal device, a quantity of colliding carriers in each measurement gap in the set; and determining, by the terminal device, the maximum quantity of colliding carriers in the set based on the quantity of colliding carriers in each measurement gap.

In a possible implementation of the third aspect, the quantity of colliding carriers includes a total quantity of carrier(s) that collide with the measurement window of the first carrier in one measurement gap in the set.

In a possible implementation of the third aspect, the collision includes: a part or all of the measurement window of the first carrier and a part or all of a measurement window of at least one carrier are in one measurement gap in the set.

In a possible implementation of the third aspect, the determining, by a terminal device, a measurement requirement on a first carrier based on a maximum quantity of colliding carriers includes: determining, by the terminal device, a first parameter of the first carrier based on the maximum quantity of colliding carriers; and determining, by the terminal device, the measurement requirement based on the first parameter.

In a possible implementation of the third aspect, the determining, by the terminal device, a first parameter of the first carrier based on the maximum quantity of colliding carriers includes: determining, by the terminal device, the maximum quantity of colliding carriers that collide with the first carrier as the first parameter.

In a possible implementation of the third aspect, the determining, by the terminal device, the measurement requirement based on the first parameter includes: determining the measurement requirement according to the following formula:

$$S=\text{Max}(T1,T2)*\lceil R*A \rceil$$

where S is a value of a measurement counter of the measurement requirement, R is a quantity of measurement opportunities that corresponds to the measurement requirement. T1 is a period of the measurement window, T2 is a period of the measurement gap, a value of Max(T1, T2) is a larger value of T1 and T2, and A is the first parameter.

In a possible implementation of the third aspect, the determining, by the terminal device, the measurement requirement based on the first parameter includes: determining the measurement requirement according to the following formula:

$$S=R*\text{Max}(T1,T2)*\lceil A \rceil$$

where S is a value of a measurement counter of the measurement requirement, R is a quantity of measurement opportunities that corresponds to the measurement requirement, T1 is a period of the measurement window, T2 is a period of the measurement gap, a value of Max(T1, T2) is a larger value of T1 and T2, and A is the first parameter.

In a possible implementation of the third aspect, the determining, by the terminal device, the measurement requirement based on the first parameter includes: determining the measurement requirement according to the following formula:

$$S=R*\text{Max}(T1,T2)*A$$

where S is a value of a measurement counter of the measurement requirement, R is a quantity of measurement opportunities that corresponds to the measurement requirement, T1 is a period of the measurement window, T2 is a period of the measurement gap, a value of Max(T1, T2) is a larger value of T1 and T2, and A is the first parameter.

In a possible implementation of the third aspect, the determining, by the terminal device, the measurement requirement based on the first parameter includes: determining the measurement requirement according to the following formula:

$$S=\text{Max}(T1,T2)*\lceil R*A \rceil *C$$

where S is a value of a measurement counter of the measurement requirement, R is a quantity of measurement opportunities that corresponds to the measurement requirement, C is a coefficient, T1 is a period of the measurement window, T2 is a period of the measurement gap, a value of Max(T1, T2) is a larger value of T1 and T2, and A is the first parameter.

In a possible implementation of the third aspect, the determining, by the terminal device, the measurement requirement based on the first parameter includes: determining the measurement requirement according to the following formula:

$$S=R*\text{Max}(T1,T2)*\lceil A \rceil *E$$

where S is a value of a measurement counter of the measurement requirement, R is a quantity of measurement opportunities that corresponds to the measurement requirement, E is a coefficient, T1 is a period of the measurement window, T2 is a period of the measurement gap, a value of Max(T1, T2) is a larger value of T1 and T2, and A is the first parameter.

In a possible implementation of the third aspect, the determining, by the terminal device, the measurement requirement based on the first parameter includes: determining the measurement requirement according to the following formula:

$$S=R*\text{Max}(T1,T2)*A*N$$

where S is a value of a measurement counter of the measurement requirement, R is a quantity of measurement opportunities that corresponds to the measurement requirement, N is a coefficient, T1 is a period of the measurement window, T2 is a period of the measurement gap, a value of Max(T1, T2) is a larger value of T1 and T2, and A is the first parameter.

In a possible implementation of the third aspect, the determining, by the terminal device, the measurement requirement based on the first parameter includes: determining the measurement requirement according to the following formula:

$$S=H*A$$

where S is a value of a measurement counter of the measurement requirement, H is a constant, and A is the first parameter.

According to a fourth aspect, a method for measurement on a carrier is provided. The method includes: receiving, by a network device, a measurement result on a first carrier, where the measurement result on the first carrier is determined based on a measurement requirement on the first carrier, where the measurement requirement on the first carrier is determined based on a maximum quantity of colliding carriers that collide with the first carrier, the maximum quantity of colliding carriers is determined based on a measurement gap and a measurement window of the first carrier, and the measurement gap is a measurement gap used at least for the first carrier; and configuring, by the network device, the first carrier based on the measurement result.

In a possible implementation of the fourth aspect, the maximum quantity of colliding carriers is determined based on the measurement gap and a measurement window of each carrier in one or more carriers, the measurement gap is a measurement gap applied to the one or more carriers, and the one or more carriers include the first carrier.

In a possible implementation of the fourth aspect, the measurement window of the first carrier is a measurement window of a synchronization signal block SSB on the first carrier, and the measurement gap is a measurement gap used at least for the SSB on the first carrier.

According to a fifth aspect, a terminal device is provided. The terminal device includes a processor, a memory, and a transceiver that are configured to support the terminal device in performing a corresponding function in the foregoing methods, the processor, the memory, and the transceiver are connected via a communications module, the memory stores an instruction, and the transceiver is configured to perform specific signal sending and receiving under driving of the processor. The processor is configured to determine a measurement requirement on a first carrier based on an average measurement probability and/or a minimum measurement probability on the first carrier, where the average measurement probability and/or the minimum measurement probability are/is determined based on a measurement gap and a measurement window of the first carrier, and the measurement gap is a measurement gap used at least for the first carrier. The processor is further configured to perform measurement on the first carrier based on the measurement requirement.

In a possible implementation of the fifth aspect, the average measurement probability and/or the minimum measurement probability are/is determined based on the measurement gap and a measurement window of each carrier in one or more carriers, the measurement gap is a measurement gap applied to the one or more carriers, and the one or more carriers include the first carrier.

In a possible implementation of the fifth aspect, the processor is further configured to: determine a set of one or more measurement gaps in which one or more measurement windows of the first carrier are located; and determine the average measurement probability and/or the minimum measurement probability on the first carrier in the set.

In a possible implementation of the fifth aspect, the processor is specifically configured to: determine a measurement probability on the first carrier in each measurement gap in the set and determine the average measurement probability and/or the minimum measurement probability on the first carrier in the set based on the measurement probability on the first carrier in each measurement gap.

In a possible implementation of the fifth aspect, the processor is specifically configured to: determine a quantity of colliding carriers in each measurement gap in the set; and determine the measurement probability on the first carrier in each measurement gap in the set based on the quantity of colliding carriers in each measurement gap.

In a possible implementation of the fifth aspect, the quantity of colliding carriers includes a total quantity of carrier(s) that collide with the measurement window of the first carrier in one measurement gap in the set.

In a possible implementation of the fifth aspect, the collision includes: a part or all of the measurement window of the first carrier and a part or all of a measurement window of at least one carrier are in one measurement gap in the set.

In a possible implementation of the fifth aspect, the measurement window includes one or more of a start position of the measurement window, duration of the measurement window, and a period of the measurement window; and/or the measurement gap includes one or more of a start position of the measurement gap, duration of the measurement gap, and a period of the measurement gap.

In a possible implementation of the fifth aspect, the processor is specifically configured to: determine a first parameter of the first carrier based on the average measurement probability and/or the minimum measurement probability on the first carrier, and determine the measurement requirement based on the first parameter.

In a possible implementation of the fifth aspect, the processor is specifically configured to determine a reciprocal of the average measurement probability or a reciprocal of the minimum measurement probability on the first carrier as the first parameter.

In a possible implementation of the fifth aspect, the processor is specifically configured to determine the measurement requirement according to the following formula:

$$S=R*\text{Max}(T1,T2)*[A]$$

where S is a value of a measurement counter of the measurement requirement, R is a quantity of measurement opportunities that corresponds to the measurement requirement, T1 is the period of the measurement window, T2 is the period of the measurement gap, a value of Max(T1. T2) is a larger value of T and T2, and A is the first parameter.

In a possible implementation of the fifth aspect, the processor is specifically configured to determine the measurement requirement according to the following formula:

$$S=\text{Max}(T1,T2)*[R*A]$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T and T2, and A is the first parameter.

In a possible implementation of the fifth aspect, the processor is specifically configured to determine the measurement requirement according to the following formula:

$$S=R*\text{Max}(T1,T2)*A$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

In a possible implementation of the fifth aspect, the processor is specifically configured to determine the measurement requirement according to the following formula:

$$S=\text{Max}(T1,T2)*[R*A]*C$$

where S is a value of a measurement counter of the measurement requirement, R is a quantity of measurement opportunities that corresponds to the measurement requirement, C is a coefficient, T1 is the period of the measurement window, T2 is the period of the measurement gap, a value of Max(T1, T2) is a larger value of T1 and T2, and A is the first parameter.

In a possible implementation of the fifth aspect, the processor is specifically configured to determine the measurement requirement according to the following formula:

$$S=R*\text{Max}(T1,T2)*[A]*E$$

where S is a value of a measurement counter of the measurement requirement, R is a quantity of measurement opportunities that corresponds to the measurement requirement, E is a coefficient, T1 is the period of the measurement window, T2 is the period of the measurement gap, a value of Max(T1, T2) is a larger value of T1 and T2, and A is the first parameter.

In a possible implementation of the fifth aspect, the processor is specifically configured to determine the measurement requirement according to the following formula:

$$S=R*\text{Max}(T1,T2)*A*N$$

where S is a value of a measurement counter of the measurement requirement, R is a quantity of measurement opportunities that corresponds to the measurement requirement. N is a coefficient, T1 is the period of the measurement window, T2 is the period of the measurement gap, a value of Max(T1, T2) is a larger value of T1 and T2, and A is the first parameter.

In a possible implementation of the fifth aspect, the processor is specifically configured to determine the measurement requirement according to the following formula:

$$S=H*A$$

where S is a value of a measurement counter of the measurement requirement, H is a constant, and A is the first parameter.

In a possible implementation of the fifth aspect, the measurement window of the first carrier is a measurement window of a synchronization signal block SSB on the first carrier, and the measurement gap is a measurement gap used at least for the SSB on the first carrier.

According to a sixth aspect, a terminal device is provided. The terminal device includes a processor, a memory, and a transceiver that are configured to support the terminal device in performing a corresponding function in the foregoing methods, the processor, the memory, and the transceiver are connected via a communications module, the memory stores an instruction, and the transceiver is configured to perform specific signal sending and receiving under driving of the processor. The processor is configured to: determine a measurement requirement on a first carrier based on a maximum quantity of colliding carriers that collide with the first carrier, where the maximum quantity of colliding carriers is determined based on a measurement gap and a measurement window of the first carrier, and the measurement gap is a measurement gap used at least for the first carrier. The processor is further configured to performs measurement on the first carrier based on the measurement requirement.

In a possible implementation of the sixth aspect, the maximum quantity of colliding carriers is determined based on the measurement gap and a measurement window of each carrier in one or more carriers, the measurement gap is a measurement gap applied to the one or more carriers, and the one or more carriers include the first carrier.

In a possible implementation of the sixth aspect, the processor is further configured to: determine a set of one or more measurement gaps in which one or more measurement windows of the first carrier are located; and determine the maximum quantity of colliding carriers in the set.

In a possible implementation of the sixth aspect, the processor is specifically configured to: determine a quantity of colliding carriers in each measurement gap in the set; and determine the maximum quantity of colliding carriers in the set based on the quantity of colliding carriers in each measurement gap.

In a possible implementation of the sixth aspect, the quantity of colliding carriers includes a total quantity of carrier(s) that collide with the measurement window of the first carrier in one measurement gap in the set.

In a possible implementation of the sixth aspect, the collision includes: a part or all of the measurement window of the first carrier and a part or all of a measurement window of at least one carrier are in one measurement gap in the set.

In a possible implementation of the sixth aspect, the processor is specifically configured to: determine a first parameter of the first carrier based on the maximum quantity of colliding carriers; and determine the measurement requirement based on the first parameter.

In a possible implementation of the sixth aspect, the processor is specifically configured to determine the maximum quantity of colliding carriers that collide with the first carrier as the first parameter.

In a possible implementation of the sixth aspect, the processor is specifically configured to determine the measurement requirement according to the following formula:

$$S=R*\text{Max}(T1,T2)*[A]$$

where S is a value of a measurement counter of the measurement requirement, R is a quantity of measurement opportunities that corresponds to the measurement requirement, T1 is a period of the measurement window, T2 is a period of the measurement gap, a value of Max(T1, T2) is a larger value of T1 and T2, and A is the first parameter.

In a possible implementation of the sixth aspect, the processor is specifically configured to determine the measurement requirement according to the following formula:

$$S=\text{Max}(T1,T2)*[R*A]$$

where S is a value of a measurement counter of the measurement requirement, R is a quantity of measurement opportunities that corresponds to the measurement requirement. T1 is a period of the measurement window, T2 is a period of the measurement gap, a value of Max(T1, T2) is a larger value of T1 and T2, and A is the first parameter.

In a possible implementation of the sixth aspect, the processor is specifically configured to determine the measurement requirement according to the following formula:

$$S=R*\text{Max}(T1,T2)*A$$

where S is a value of a measurement counter of the measurement requirement, R is a quantity of measurement opportunities that corresponds to the measurement requirement. T1 is a period of the measurement window, T2 is a period of the measurement gap, a value of Max(T1, T2) is a larger value of T1 and T2, and A is the first parameter.

In a possible implementation of the sixth aspect, the processor is specifically configured to determine the measurement requirement according to the following formula:

$$S=\text{Max}(T1,T2)*[R*A]*C$$

where S is a value of a measurement counter of the measurement requirement, R is a quantity of measurement opportunities that corresponds to the measurement requirement, C is a coefficient, T1 is a period of the measurement window, T2 is a period of the measurement gap, a value of Max(T1, T2) is a larger value of T1 and T2, and A is the first parameter.

In a possible implementation of the sixth aspect, the processor is specifically configured to determine the measurement requirement according to the following formula:

$$S=R*\text{Max}(T1,T2)*[A]*E$$

where S is a value of a measurement counter of the measurement requirement, R is a quantity of measurement opportunities that corresponds to the measurement requirement, E is a coefficient, T1 is a period of the measurement window, T2 is a period of the measurement gap, a value of Max(T1, T2) is a larger value of T1 and T2, and A is the first parameter.

In a possible implementation of the sixth aspect, the processor is specifically configured to determine the measurement requirement according to the following formula:

$$S=R*\text{Max}(T1,T2)*A*N$$

where S is a value of a measurement counter of the measurement requirement, R is a quantity of measurement opportunities that corresponds to the measurement requirement, N is a coefficient, T1 is a period of the measurement window, T2 is a period of the measurement gap, a value of Max(T1, T2) is a larger value of T1 and T2, and A is the first parameter.

In a possible implementation of the sixth aspect, the processor is specifically configured to determine the measurement requirement according to the following formula:

$$S=H*A$$

where S is a value of a measurement counter of the measurement requirement, H is a constant, and A is the first parameter.

In a possible implementation of the sixth aspect, the measurement window of the first carrier is a measurement window of a synchronization signal block SSB on the first carrier, and the measurement gap is a measurement gap used at least for the SSB on the first carrier.

According to a seventh aspect, a terminal device is provided. The terminal device includes a processing module, a storage module, and a transceiver module that are configured to support the terminal device in performing a function of the terminal device according to any one of the first aspect, the third aspect, or the possible implementations of the first aspect and the third aspect. The function may be implemented by hardware, or may be implemented by hardware executing corresponding software. The hardware or the software includes one or more modules corresponding to the foregoing function.

According to an eighth aspect, a network device is provided. The network device includes a processor, a memory, and a transceiver that are configured to support the network device in performing a corresponding function in the foregoing methods, the processor, the memory, and the transceiver are connected via a communications module, the memory stores an instruction, and the transceiver is configured to perform specific signal sending and receiving under driving of the processor. The transceiver is configured to receive a measurement result on a first carrier, where the measurement result on the first carrier is determined based on a measurement requirement on the first carrier, where the measurement requirement on the first carrier is determined based on an average measurement probability and/or a minimum measurement probability on the first carrier, the average measurement probability and/or the minimum measurement probability on the first carrier are/is determined based on a measurement gap and a measurement window of the first carrier, and the measurement gap is a measurement gap used at least for the first carrier. The processor is configured to configure the first carrier based on the measurement result.

In a possible implementation of the eighth aspect, the average measurement probability and/or the minimum measurement probability are/is determined based on the measurement gap and a measurement window of each carrier in one or more carriers, the measurement gap is a measurement gap applied to the one or more carriers, and the one or more carriers include the first carrier.

In a possible implementation of the eighth aspect, the measurement window of the first carrier is a measurement window of a synchronization signal block SSB on the first carrier, and the measurement gap is a measurement gap used at least for the SSB on the first carrier.

According to a ninth aspect, a network device is provided. The network device includes a processor, a memory, and a transceiver that are configured to support the network device in performing a corresponding function in the foregoing methods. The processor, the memory, and the transceiver are connected via a communications module, the memory stores an instruction, and the transceiver is configured to perform specific signal sending and receiving under driving of the processor. The transceiver is configured to receive a measurement result on a first carrier, where the measurement result on the first carrier is determined based on a measurement requirement on the first carrier, where the measurement requirement on the first carrier is determined based on a maximum quantity of colliding carriers that collide with the first carrier, the maximum quantity of colliding carriers is determined based on a measurement gap and a measurement window of the first carrier, and the measurement gap is a measurement gap used at least for the first carrier. The processor is configured to configure the first carrier based on the measurement result.

In a possible implementation of the ninth aspect, the maximum quantity of colliding carriers is determined based on the measurement gap and a measurement window of each carrier in one or more carriers, the measurement gap is a measurement gap applied to the one or more carriers, and the one or more carriers include the first carrier.

In a possible implementation of the ninth aspect, the measurement window of the first carrier is a measurement window of a synchronization signal block SSB on the first carrier, and the measurement gap is a measurement gap used at least for the SSB on the first carrier.

According to a tenth aspect, a network device is provided. The network device includes a processing module, a storage module, and a transceiver module that are configured to support the network device in performing a function of the network device according to any one of the second aspect, the fourth aspect, or the possible implementations of the second aspect and the fourth aspect. The function may be implemented by hardware, or may be implemented by hardware executing corresponding software. The hardware or the software includes one or more modules corresponding to the foregoing function.

According to an eleventh aspect, a communications apparatus is provided. The communications apparatus may perform the method for measurement on a carrier according to any one of the foregoing aspects. According to the communications apparatus provided in this embodiment of this application, a measurement counter on each carrier on which measurement needs to be performed by the communications apparatus may be defined based on a measurement window and a measurement gap that are related to the carrier. Fairness and competitiveness of measurement opportunities on different carriers are considered. A measurement delay of the communications apparatus is reduced. In addition, a requirement on a measurement capability of the communications apparatus is prevented from being excessively high, costs of the communications apparatus are reduced, and user experience is improved.

According to a twelfth aspect, an apparatus is provided. The apparatus is configured to perform the method according to any one of the first to the fourth aspects or the possible implementations of the first to the fourth aspects.

According to a thirteenth aspect, an apparatus is provided. The apparatus includes a processor, configured to execute a program in a memory, to implement the method according to any one of the first to the fourth aspects or the possible implementations of the first to the fourth aspects.

According to a fourteenth aspect, an apparatus is provided. The apparatus includes a processor, where the processor is coupled to a memory;

the memory is configured to store a computer program; and the processor is configured to execute the computer program stored in the memory, so that the apparatus performs the method according to any one of the first to the fourth aspects or the possible implementations of the first to the fourth aspects.

According to a fifteenth aspect, an apparatus is provided. The apparatus includes a processor and a transceiver, where the processor is configured to execute a computer program stored in a memory, so that the apparatus performs the method according to any one of the first to the fourth aspects or the possible implementations of the first to the fourth aspects.

According to a sixteenth aspect, an apparatus is provided. The apparatus includes a processor, a memory, and a transceiver, where the memory is configured to store a computer program; and the processor is configured to execute the computer program stored in the memory, so that the apparatus performs the method according to any one of the first to the fourth aspects or the possible implementations of the first to the fourth aspects.

According to a seventeenth aspect, an apparatus is provided. The apparatus includes a unit or a means configured to perform the step according to any one of the first to the fourth aspects or the possible implementations of the first to the fourth aspects.

According to an eighteenth aspect, a processor is provided. The processor includes at least one circuit, configured to perform the method according to any one of the first to the fourth aspects or the possible implementations of the first to the fourth aspects.

According to a nineteenth aspect, a computer program product is provided. The computer program product includes computer program code, and when the computer program code is run on a computer, the computer is enabled to perform the method according to any one of the foregoing aspects.

According to a twentieth aspect, a computer-readable medium is provided. The computer-readable medium stores program code. When the computer program code is run on a computer, the computer is enabled to perform the method according to any one of the foregoing aspects.

According to a twenty-first aspect, a chip system is provided. The chip system includes a processor, to enable a communications apparatus to implement a function according to any one of the foregoing aspects, such as generating, receiving, sending, or processing data and/or information in the foregoing methods. In a possible design, the chip system further includes a memory. The memory is configured to store a program instruction and data that are necessary for the communications apparatus. The chip system may include a chip, or may include a chip and another discrete component. The processor and the memory may be decoupled, are separately disposed on different devices, and are connected in a wired or wireless manner; or the processor and the memory may be coupled to a same device.

According to a twenty-second aspect, a system is provided. The system includes the foregoing terminal device and the foregoing network device.

BRIEF DESCRIPTION OF DRAWINGS

FIG. 5 is a schematic flowchart of a method for measurement on a carrier according to an embodiment of this application:

FIG. 11 is a schematic flowchart of a method for measurement on a carrier according to still another embodiment of this application;

FIG. 12 is a schematic block diagram of a terminal device according to an embodiment of this application;

DESCRIPTION OF EMBODIMENTS

Figure 1:
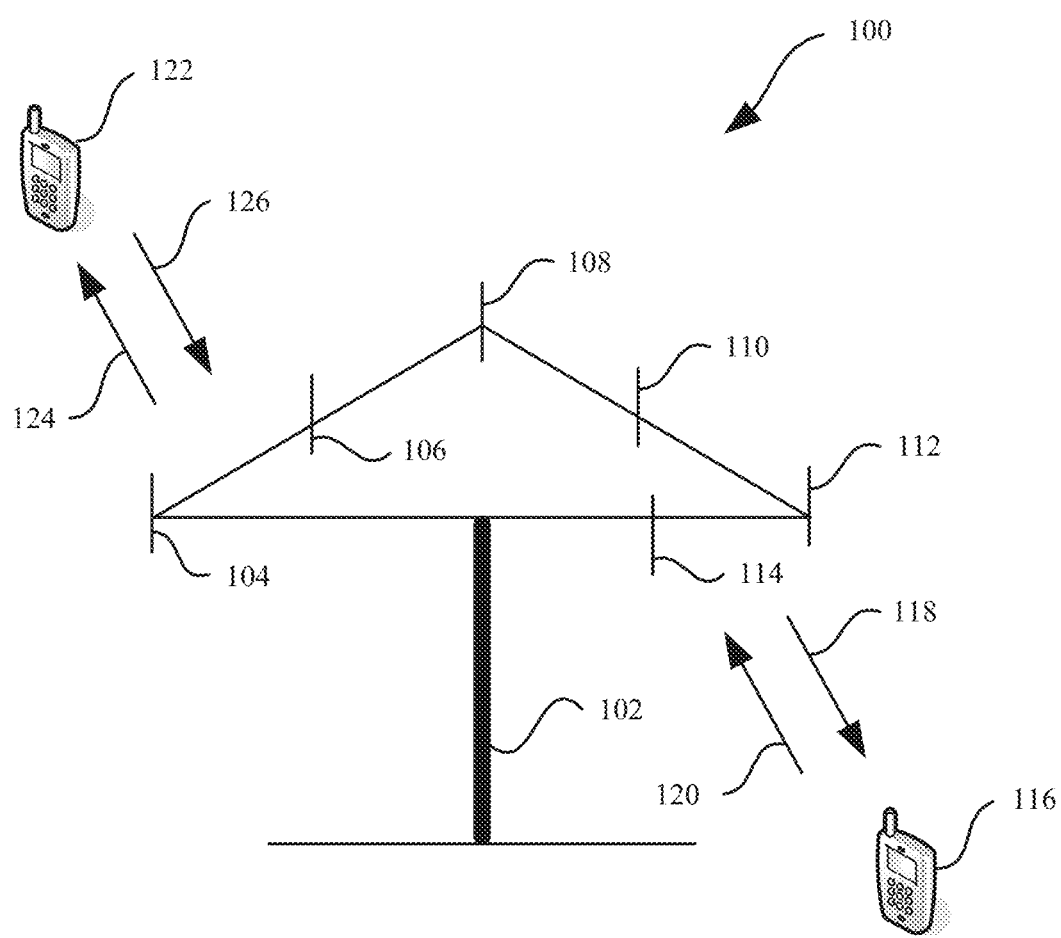
FIG. 1 is a schematic diagram of a communications system to which a method for measurement on a carrier in this application is applicable.

The following describes technical solutions of this application with reference to accompanying drawings.

The technical solutions of the embodiments of this application may be applied to various communications systems, such as a global system for mobile communications (Global System for Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, and a 5th generation (5th Generation, 5G) system or new radio (New Radio, NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternately be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a 5G network, a terminal device in a future evolved public land mobile network (Public Land Mobile Network, PLMN), or the like. This is not limited in the embodiments of this application.

A network device in the embodiments of this application may be a device configured to communicate with the terminal device. The network device may be a base transceiver station (Base Transceiver Station, BTS) in the global system for mobile communications (Global System for Mobile communication, GSM) system or the code division multiple access (Code Division Multiple Access, CDMA) system may be a NodeB (NodeB, NB) in the wideband code division multiple access (Wideband Code Division Multiple Access, WCDMA) system, may be an evolved NodeB (Evolutional NodeB, eNB or eNodeB) in the LTE system, or may be a radio controller in a cloud radio access network (Cloud Radio Access Network, CRAN) scenario. Alternatively, the network device may be a relay node, an access point, a vehicle-mounted device, a wearable device, a network device in the 5G network, a network device in the future evolved PLMN, or the like. This is not limited in the embodiments of this application.

The network device in the embodiments of this application may be the device configured to communicate with the terminal device. The network device may be the base transceiver station (Base Transceiver Station, BTS) in the global system for mobile communications (Global System for Mobile communication, GSM) system or the code division multiple access (Code Division Multiple Access, CDMA) system, may be the NodeB (NodeB, NB) in the wideband code division multiple access (Wideband Code Division Multiple Access, WCDMA) system, may be the evolved NodeB (Evolutional NodeB, eNB or eNodeB) in the LTE system, or may be the radio controller in the cloud radio access network (Cloud Radio Access Network, CRAN) scenario. Alternatively, the network device may be the relay node, the access point, the vehicle-mounted device, the wearable device, the network device in the 5G network, the network device in the future evolved PLMN, or the like. This is not limited in the embodiments of this application.

FIG. 1 is a schematic diagram of a communications system 100 to which a method for measurement on a carrier in this application is applicable. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, an encoder, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other proper device used for communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in an FDD system, for example, the forward link 118 may use a frequency band different from that used by the reverse link 120, and the forward link 124 may use a frequency band different from that used by the reverse link 126.

For another example, in a TDD system and a full duplex (full duplex) system, the forward link 118 and the reverse link 120 may use a common frequency band, and the forward link 124 and the reverse link 126 may use a common frequency band.

Each antenna (or an antenna group including a plurality of antennas) and/or each area that are/is designed for communication are/is referred to as a sector of the network device 102. For example, an antenna group may be designed to communicate with a terminal device in the sector within coverage of the network device 102. In a process in which the network device 102 separately communicates with the terminal devices 116 and 122 over the forward links 118 and 124, a transmit antenna of the network device 102 can improve signal-to-noise ratios of the forward links 118 and 124 through beamforming. In addition, in comparison with a manner in which a network device sends, by using a single antenna, a signal to all terminal devices served by the network device, in this case, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent to the wireless communications receiving apparatus over a channel. The data bits may be included in a transport block (or a plurality of transport blocks) of the data, and the transport block may be segmented to generate a plurality of code blocks.

In addition, the communications system 100 may be a PLMN, a device-to-device (device-to-device, D2D) network, a machine-to-machine (machine-to-machine. M2M) network, or another network. FIG. 1 is merely a simplified schematic diagram of an example. The network may further include another network device which is not shown in FIG. 1.

A terminal device that supports communication in the NR standard needs to perform cell identification and measurement on a plurality of carriers. These carriers may be intra-frequency carriers or inter-frequency carriers. An intra-frequency carrier (which may also be referred to as a "serving carrier") is a carrier on which a serving cell of the terminal device is located. The terminal device may send/receive data to/from the serving cell or perform another operation on the serving carrier. An inter-frequency carrier is a carrier other than the serving carrier. The inter-frequency carrier and the intra-frequency carrier may belong to a same standard, for example, the NR standard, the LTE standard, or the GSM standard. Certainly, the intra-frequency carrier and the inter-frequency carrier may alternatively belong to different standards. On the inter-frequency carrier, the terminal device does not send or receive data, but performs cell search, detects a synchronization signal block (Synchronization Signal Block, SSB) of a cell, measures a reference signal, and so on, to obtain a physical cell identifier, timing information, a measurement result based on the reference signal, and the like of the inter-frequency cell. The intra-frequency carrier may be an intra-frequency (intra-frequency) carrier defined in an existing protocol. The inter-frequency carrier may be an inter-frequency (inter-frequency) carrier defined in the existing protocol.

Figure 2:
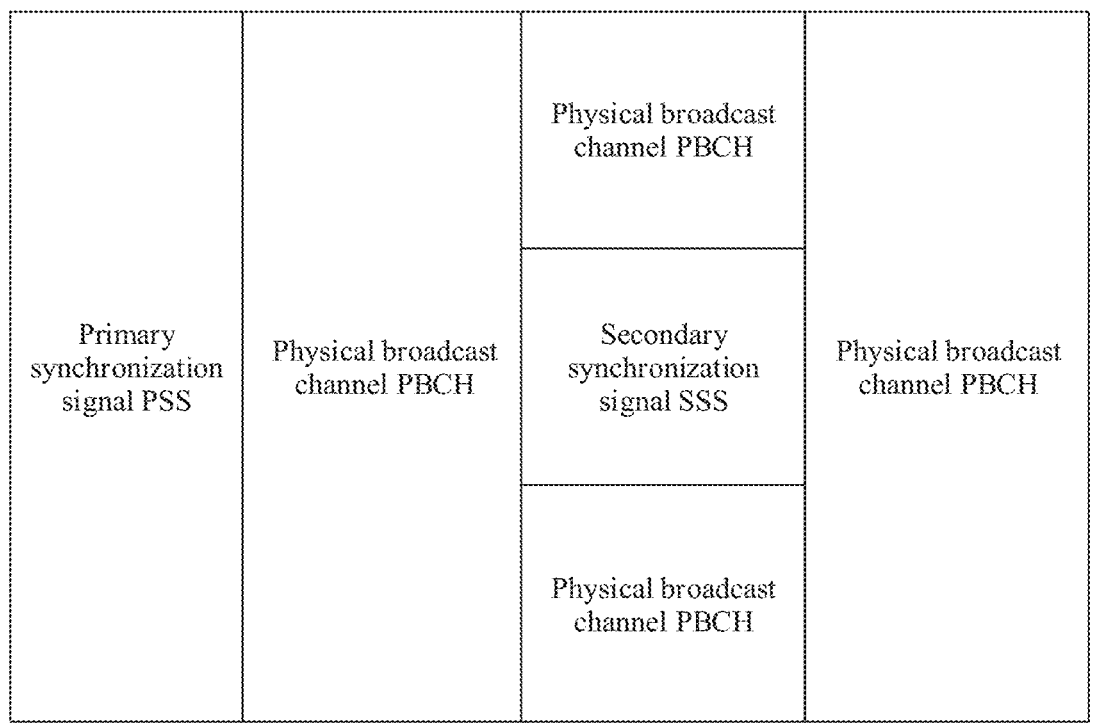
FIG. 2 is a possible schematic structural diagram of a synchronization signal block.

A synchronization signal block, or referred to as a synchronization signal (Synchronization Signal, SS)/physical broadcast channel block (physical Broadcast channel block, PBCH block), is a signal structure, and is applicable to a 5G communications system and a subsequent communications system. FIG. 2 is a possible schematic structural diagram of a synchronization signal block. As shown in FIG. 2, the synchronization signal block includes a primary synchronization signal (Primary Synchronization Signal, PSS), a secondary synchronization signal (Secondary Synchronization Signal, SSS), and a physical broadcast channel (Physical Broadcast Channel, PBCH). The PSS and the SSS are mainly used to help user equipment identify a cell and synchronize with the cell. The PBCH includes most-basic system information, for example, a system frame number or intra-frame timing information. The user equipment accesses the cell under the premise that the user equipment successfully receives a synchronization signal block.

Figure 3:
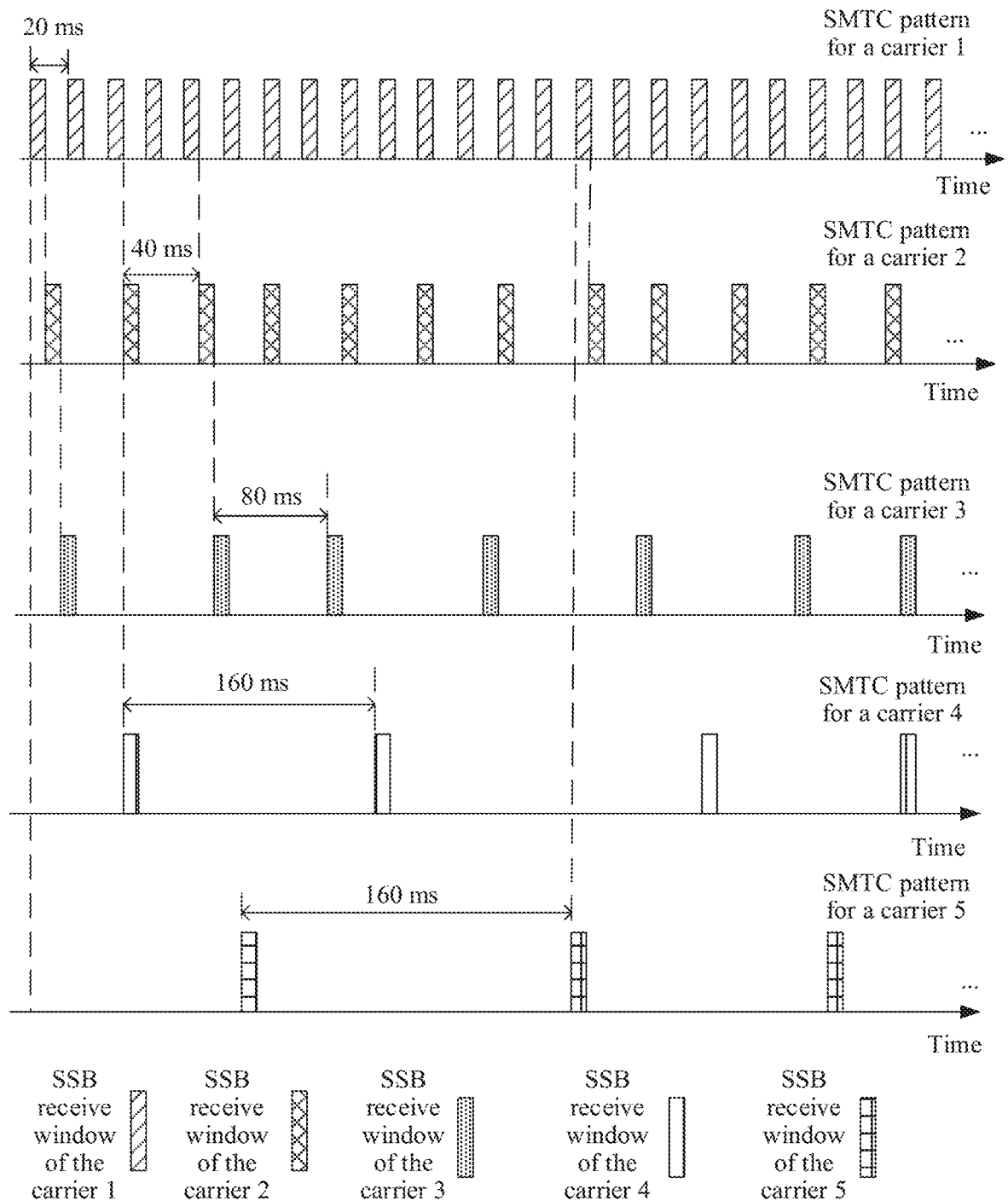
FIG. 3 is a schematic diagram of an SMTC pattern configured for a carrier according to an embodiment of this application.

The network device configures corresponding reference signal configuration information for each carrier, especially an inter-frequency carrier, to notify the terminal device of information such as a period of measuring or receiving a reference signal on the carrier. A synchronization signal block is used as an example for description. The network device configures an SSB-based measurement timing configuration (SSB Measurement Timing Configuration, SMTC) for the terminal device. FIG. 3 is a schematic diagram of five SMTC patterns configured for five carriers. The SMTC includes an SMTC period, the SMTC period is a period in which the terminal device receives or measures an SSB, and an SSB period is an interval between every two SSB receive windows. The SMTC may further include a position, a length, and the like of the SSB receive window. The terminal device receives or measures the SSB on a time-frequency resource on which the SSB receive window is located. For different carriers, for example, an inter-frequency carrier or an intra-frequency carrier, the network device correspondingly configures an SMTC pattern (corresponding to an SMTC). The SMTC pattern may include information such as the SMTC period and the position of the SSB receive window. As shown in FIG. 3, for a carrier 1, an SMTC period is 20 ms, to be specific, a time interval between two SSB receive windows is 20 ms. For carriers 2 to 5, SMTC periods are respectively 40 ms, 80 ms, 160 ms, and 160 ms.

It should be understood that FIG. 3 is merely an example, and is merely used to describe a form of and content included in the SMTC. The SMTC may alternatively be represented in another form, for example, in a form of a table. Alternatively, the SMTC may further include other content. This is not limited in the embodiments of this application.

Figure 4:
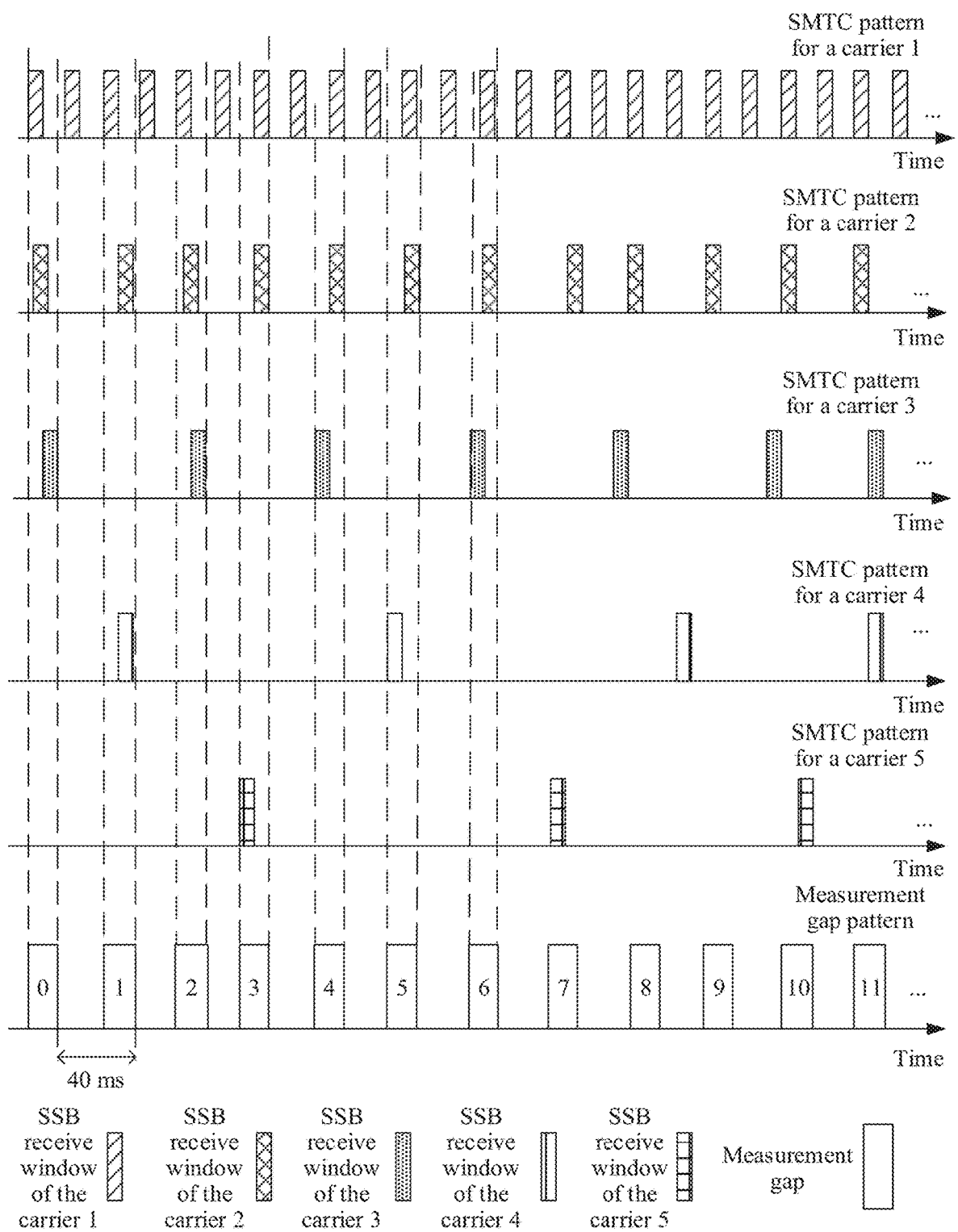
FIG. 4 is a schematic diagram of a measurement gap pattern configured for a carrier.

For a terminal device, the network device configures a uniform measurement gap pattern (Measurement Gap Pattern, MGP) for all or a part of carriers (including an intra-frequency carrier and/or an inter-frequency carrier) on which detection needs to be performed by the terminal device or all or a part of carriers (including an intra-frequency carrier and/or an inter-frequency carrier) in a frequency range. The MGP may include information such as a measurement gap length (Measurement Gap Length, MGL) and a measurement gap repetition period (Measurement Gap Repetition Period, MGRP). The terminal device performs signal detection or the like on a time-frequency resource on which a measurement gap is located, and the MGRP is an interval between every two measurement gap lengths. The terminal device may perform, in a time segment whose time length is the measurement gap (Measurement Gap) length, a cell identification operation, a cell measurement operation, or another operation on a plurality of carriers based on the information included in the measurement gap pattern. FIG. 4 is a schematic diagram of a measurement gap pattern configured for five carriers. A synchronization signal block is used as an example for description. As shown in FIG. 4, a measurement gap repetition period is 40 ms. For carriers 1 to 5, SMTC periods are respectively 20 ms, 40 ms, 80 ms, 160 ms, and 160 ms. The measurement gap pattern is applied to the carriers 1 to 5. The terminal device may perform an operation such as SSB measurement on the carriers 1 to 5 in a time segment (whose time length is a measurement gap length) in which a measurement gap is located. For example, in a measurement gap numbered 0, a reference signal on one or more of the carriers 1, 2, and 3 may be selected for measurement. In a measurement gap numbered 1, a reference signal on one or more of the carriers 1, 2, and 4 may be selected for measurement.

In a standard protocol, some measurement counters (measurement requirements) need to be defined to standardize a measurement behavior of the terminal device, especially in inter-frequency measurement. For example, the measurement counters may include a cell identification time, a synchronization signal detection time, and a reference signal index read time. The terminal device performs signal measurement and the like on a plurality of carriers based on these measurement counters.

Currently, in an LTE system, for a terminal device, a same measurement counter is defined for all carriers on which measurement needs to be performed by the terminal device. However, periods that are of reference signals and that are configured on carriers in NR are different. Therefore, in a same time segment, measurement may be performed on the carriers at different opportunities. For example, descriptions are provided by using the example shown in FIG. 3. The SMTC periods configured for the carriers 1 to 5 are different. The SMTC period for the carrier 1 is 20 ms, the SMTC period for the carrier 5 is 160 ms, and a value of an MGRP is 40 ms. In a same time segment, it is assumed that start positions of receive windows of the carrier 1 and the carrier 5 are the same. For example, in a time segment of 160 ms, the carrier 1 may have four measurement opportunities, and the carrier 5 may have only one measurement opportunity. To ensure that there are enough measurement opportunities for those carriers with relatively large SMTC periods, a very long measurement counter is inevitably defined. For example, a very long cell identification time or measurement period is defined. However, a very long measurement counter is not conducive to fast movement performance of the terminal device. Consequently, performance of the terminal device deteriorates, and user experience is affected.

In 5G, a measurement counter on an intra-frequency carrier is assumed as that the terminal device has at least one opportunity to perform measurement in each SMTC period (or each MGRP). It is assumed that a definition of a measurement counter on an inter-frequency carrier is similar to the foregoing definition. To be specific, the inter-frequency measurement counter means that for each carrier, the terminal device has at least one opportunity to perform measurement in each SMTC period (or each MGRP) averagely. For the inter-frequency carrier, measurement needs to be performed on a plurality of carriers. Therefore, as shown in FIG. 4, a terminal device may need to perform measurement on a plurality of carriers in a same measurement gap (Measurement Gap). For example, in the measurement gap 0, reference signals on the carriers 1, 2, and 3 need to be measured. In other words, a measurement gap available to a carrier conflicts with a measurement gap available to another carrier. If the terminal device does not support measurement on two or more carriers, for one or two of the carriers 1, 2, and 3, it cannot be ensured that there is an opportunity to perform measurement in each SMTC period (or each MGRP). To be specific, such a measurement counter requires the terminal device to meet a specific capability requirement. This increases costs of the terminal device.

A measurement requirement on an inter-frequency carrier is not defined in an existing protocol, and an inter-frequency measurement behavior of a terminal device cannot be restricted. Performance of the terminal device during inter-frequency carrier measurement is affected. Consequently, a delay of the inter-frequency measurement of the terminal device is excessively long, and normal communication of the terminal device is affected.

Based on the foregoing problem, the embodiments of this application provide a method for measurement on a carrier. For a terminal device, a measurement counter on each carrier on which measurement needs to be performed by the terminal device may be defined based on a measurement window and a measurement gap that are related to the carrier. Fairness and competitiveness of measurement opportunities on different carriers are considered. A measurement delay of the terminal device can be reduced on the basis that equality of the measurement opportunities on the carriers is fully considered. In addition, a requirement on a measurement capability of the terminal device is prevented from being excessively high, costs of the terminal device are reduced, normal communication of the terminal device is ensured, and user experience is improved. It should be understood that the method for measurement on a carrier may be further applicable to an intra-frequency carrier.

The following describes in detail a method for measurement on a carrier that is provided in this application with reference to FIG. 5. FIG. 5 is a schematic flowchart of a method 200 for measurement on a carrier according to an embodiment of this application. The method 200 may be applied to the scenario shown in FIG. 1, and certainly may also be applied to another communication scenario. This is not limited in this embodiment of this application.

As shown in FIG. 5, the method 200 includes the following steps:

S230: A terminal device determines a measurement requirement on a first carrier based on at least one of an average measurement probability on the first carrier, a minimum measurement probability on the first carrier, and a maximum quantity of colliding carriers that collide with the first carrier, where the at least one of the average measurement probability, the minimum measurement probability, and the maximum quantity of colliding carriers that collide with the first carrier is determined based on a measurement gap and a measurement window of the first carrier, and the measurement gap is a measurement gap used at least for the first carrier.

S240: The terminal device performs measurement on the first carrier based on the measurement requirement.

According to the method for measurement on a carrier that is provided in this application, for each carrier on which measurement needs to be performed by the terminal device, a measurement requirement (a measurement counter) on the carrier on which measurement is to be performed is determined based on one or more of an average measurement probability on the carrier (the first carrier) on which measurement is to be performed, a minimum measurement probability on the carrier on which measurement is to be performed, and the maximum quantity of colliding carriers that collide with the first carrier. The one or more of the average measurement probability, the minimum measurement probability, and the maximum quantity of colliding carriers that collide with the first carrier are determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. A measurement delay of the terminal device can be reduced on the basis that a measurement opportunity on each carrier is fully considered. In addition, a requirement on a measurement capability of the terminal device is prevented from being excessively high, costs of the terminal device are reduced, normal communication of the terminal device is ensured, and user experience is improved.

Specifically, in S230, when the terminal device needs to perform measurement on a carrier (where the first carrier is used as an example for description), the terminal device needs to first determine the measurement requirement on the first carrier. The measurement requirement is used to standardize a measurement behavior of the terminal device on the first carrier.

The measurement requirement is determined based on the at least one of the average measurement probability on the first carrier, the minimum measurement probability on the first carrier, and the maximum quantity of colliding carriers that collide with the first carrier. For example, a plurality of measurement gaps (a plurality of measurement time segments) in a time segment may be used to perform measurement on the first carrier, and in each measurement gap, there is a measurement probability on the first carrier and a quantity of colliding carriers that collide with the first carrier. The average measurement probability on the first carrier may be understood as an average value of measurement probabilities on the first carrier in the plurality of measurement gaps, and the minimum measurement probability on the first carrier may be understood as a smallest value of the measurement probabilities on the first carrier in the plurality of measurement gaps. For example, a time segment of 160 ms is used as an example for description. In the time segment of 160 ms, measurement may be performed on the first carrier in four measurement gaps. In the four measurement gaps, measurement probabilities on the first carrier are respectively {0.5, 0.5, 0.7, 0.3}. In this case, in a measurement time including the four measurement gaps, an average measurement probability on the first carrier is 0.5, and a minimum measurement probability on the first carrier is 0.3. Because in each measurement gap, there may be a carrier that collides with the first carrier in measurement, the maximum quantity of colliding carriers that collide with the first carrier may be understood as a largest quantity of colliding carriers in quantities, of colliding carriers, that respectively correspond to the plurality of measurement gaps. For example, in the time segment of 160 ms, measurement may be performed on the first carrier in the four measurement gaps. In the four measurement gaps, quantities of carriers that collide with the first carrier are respectively {5, 5, 7, 3}. In this case, in the measurement time including the four measurement gaps, a maximum quantity of colliding carriers that collide with the first carrier is 7.

The at least one of the average measurement probability, the minimum measurement probability, and the maximum quantity of colliding carriers is determined based on the measurement gap and the measurement window of the first carrier, and the measurement gap is the measurement gap used at least for the first carrier. The terminal device receives or measures a related signal on a time-frequency resource on which the measurement window of the first carrier is located, for example, receives or detects an SSB on a time-frequency resource on which an SSB measurement window (a receive window) is located. Positions of measurement windows corresponding to different carriers may be the same or different. To be specific, for different carriers, measurement windows configured for the carriers may be the same or different. For example, as shown in FIG. 3 or FIG. 4, the five carriers each have a corresponding measurement window, and the SMTC patterns of the five carriers each include the measurement window. The five carriers correspond to different SMTC patterns. The five SMTC patterns each include information about the measurement window of the corresponding carrier. The terminal device receives or detects a related signal in the measurement window corresponding to each carrier.

The measurement gap is the measurement gap used at least for the first carrier. The measurement gap may be included in configuration information applicable to one or more carriers, and the one or more carriers include the first carrier. The measurement gap is a measurement gap used for the one or more carriers. To be specific, the terminal device may perform, in the measurement gap, measurement on all carriers (the one or more carriers) to which the measurement gap is applicable. For the one or more carriers, each carrier has a measurement window corresponding to the carrier. The terminal device receives or detects a related signal in the measurement window corresponding to each carrier. In other words, the one or more carriers correspond to the same measurement gap, but each carrier has a corresponding measurement window. To be specific, for the one or more carriers, the measurement gap is common, and the measurement window is dedicated to each carrier. The average measurement probability on the first carrier is determined based on the measurement gap common to the one or more carriers and the measurement window dedicated to each carrier.

The terminal device may perform, based on the measurement gap, a cell identification operation, a cell measurement operation, or another operation on the one or more carriers in a time segment whose time length is the measurement gap. For example, as shown in FIG. 4, the measurement gap may be the measurement gap (Measurement Gap) shown in FIG. 4, and is applied to the carriers 1 to 5. The first carrier may be any one of the carriers 1 to 5. The terminal device may perform measurement on the one or more carriers in the measurement gap. A measurement gap pattern includes the measurement gap. It should be understood that the one or more carriers may be all carriers on which detection needs to be performed by the terminal device, or all carriers in a frequency range. This is not limited in this embodiment of this application.

The at least one of the average measurement probability on the first carrier, the minimum measurement probability on the first carrier, and the maximum quantity of colliding carriers that collide with the first carrier is determined based on the measurement window of the first carrier and the measurement gap applied at least to the first carrier. The terminal device determines the measurement requirement on the first carrier based on the at least one of the average measurement probability on the first carrier, the minimum measurement probability on the first carrier, and the maximum quantity of colliding carriers that collide with the first carrier. In other words, in a process of determining the measurement requirement on the first carrier, various measurement configuration cases related to the first carrier are fully considered. It is ensured that different carriers are processed in different manners.

In S240, the terminal device performs measurement on the first carrier based on the measurement requirement. For example, the terminal device measures a reference signal on the first carrier based on the determined measurement requirement. The terminal device measures a signal based on the measurement requirement corresponding to the carrier on which measurement is to be performed, to ensure that different carriers are processed in different manners. Different measurement requirements may be used for different carriers, and fairness and competitiveness of measurement opportunities on different carriers are fully considered.

It should be understood that, in this embodiment of this application, the first carrier may be an inter-frequency carrier, or may be an intra-frequency carrier. The one or more carriers to which the measurement gap is applied may be all intra-frequency carriers, may be all inter-frequency carriers, may include an intra-frequency carrier and an inter-frequency carrier, or may include a carrier of another standard; or there may be another case. This is not limited in this embodiment of this application.

Optionally, in an embodiment, the at least one of the average measurement probability on the first carrier, the minimum measurement probability on the first carrier, and the maximum quantity of colliding carriers that collide with the first carrier is determined based on the measurement gap and the measurement window of each carrier in the one or more carriers, and the one or more carriers include the first carrier.

Specifically, the measurement gap is the measurement gap applied to the one or more carriers. The terminal device may perform, in the measurement gap, measurement on all the carriers (the one or more carriers) to which the measurement gap is applicable. The one or more carriers include the first carrier. For the one or more carriers, each carrier has the measurement window corresponding to the carrier. The terminal device receives or detects the related signal in the measurement window corresponding to each carrier. In other words, the one or more carriers correspond to the same measurement gap, but each carrier has the corresponding measurement window. To be specific, the measurement gap is common, and the measurement window is dedicated to each carrier. The one or more of the average measurement probability on the first carrier, the minimum measurement probability on the first carrier, and the maximum quantity of colliding carriers that collide with the first carrier are determined based on the measurement gap common to the one or more carriers and the measurement window dedicated to each carrier.

Descriptions are provided by using an example shown in FIG. 4. The measurement gap is a measurement gap applied to the carriers 1 to 5, for example, measurement gaps numbered in the measurement gap pattern in FIG. 4. Each of the carriers 1 to 5 corresponds to one SMTC pattern. The five SMTC patterns may be understood as measurement configuration information corresponding to the carriers. The carriers correspond to different measurement configuration information. The measurement configuration information corresponding to each carrier includes an SSB receive window (the measurement window). It should be understood that although the measurement windows corresponding to all the carriers 1 to 5 are referred to as measurement windows, the five measurement windows are different. For example, periods of the measurement windows, start positions of the measurement windows, and lengths of the measurement windows are different. Alternatively, the measurement windows corresponding to the carriers may be named as different measurement configuration information, and distinguished by using names. For example, the measurement windows corresponding to the carriers 1 to 5 may be respectively referred to as a carrier measurement window 1, a carrier measurement window 2, a carrier measurement window 3, a carrier measurement window 4, and a carrier measurement window 5. This is not limited in this embodiment of this application. The one or more of the average measurement probability on the first carrier, the minimum measurement probability on the first carrier, and the maximum quantity of colliding carriers that collide with the first carrier are determined based on the measurement gap and the measurement window corresponding to each carrier in the one or more carriers. It is assumed that the first carrier is the carrier 1. An average measurement probability and/or a minimum measurement probability on the carrier 1 are/is determined based on the measurement gap and the measurement window corresponding to each of the carriers 1 to 5. In other words, at least one of the average measurement probability on the carrier 1, the minimum measurement probability on the carrier 1, and a maximum quantity of colliding carriers of the carrier 1 is determined based on the measurement gap pattern and the SMTC pattern of each of the carriers 1 to 5. In this embodiment, the one or more of the average measurement probability on the first carrier, the minimum measurement probability on the first carrier, and the maximum quantity of colliding carriers that collide with the first carrier are determined based on the measurement gap and the measurement window corresponding to each carrier in the one or more carriers. Various measurement configuration information (the measurement window and the measurement gap) related to the first carrier is fully considered. It is ensured that different carriers are processed in different manners. In this way, average measurement probabilities, minimum measurement probabilities, or maximum quantities of colliding carriers that correspond to different carriers may be different, and the fairness and competitiveness of the measurement opportunities on the different carriers are improved.

It should be understood that the at least one of the average measurement probability on the first carrier, the minimum measurement probability on the first carrier, and the maximum quantity of colliding carriers that collide with the first carrier may alternatively be determined based on other measurement configuration information related to the first carrier. This is not limited in this embodiment of this application.

Figure 6:
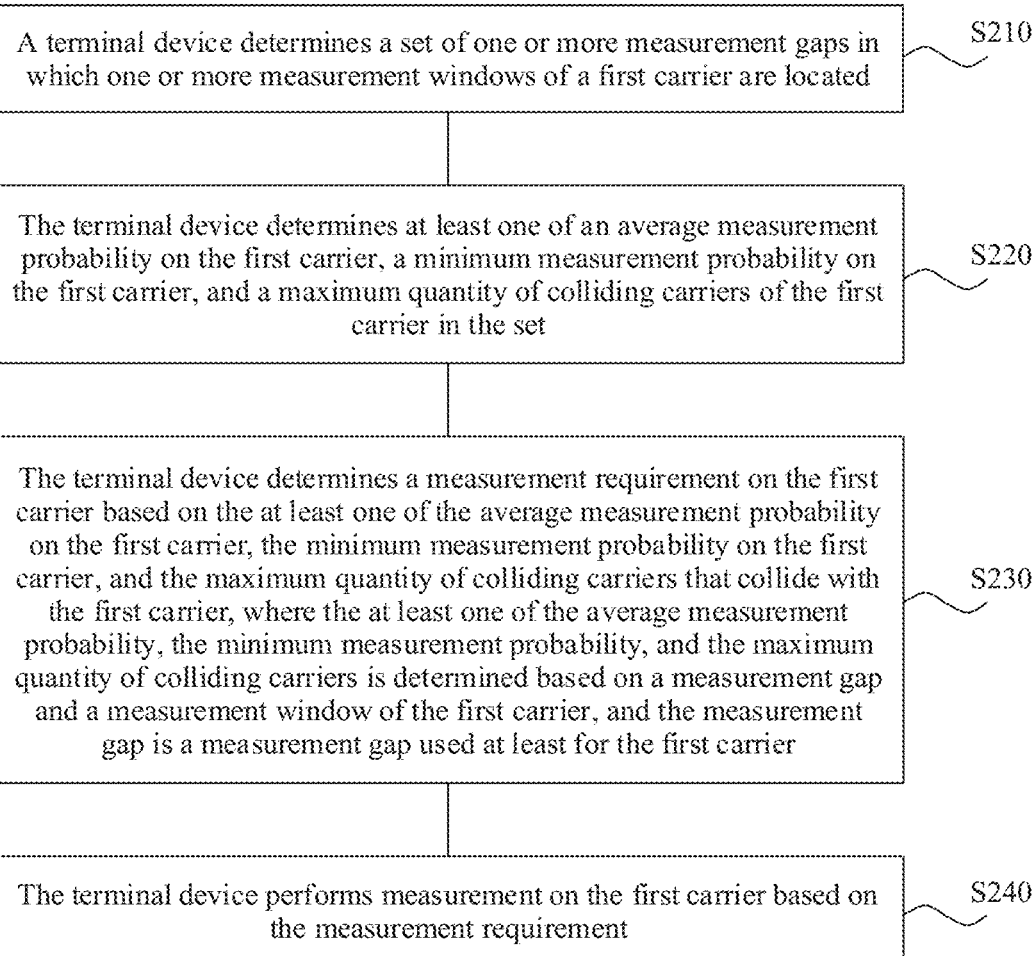
FIG. 6 is a schematic flowchart of a method for measurement on a carrier according to another embodiment of this application.

Optionally, in an embodiment, as shown in FIG. 6, the method 200 further includes the following steps:

S210: The terminal device determines a set of one or more measurement gaps in which one or more measurement windows of the first carrier are located.

S220: The terminal device determines the at least one of the average measurement probability on the first carrier, the minimum measurement probability on the first carrier, and the maximum quantity of colliding carriers that collide with the first carrier in the set.

Specifically, when the average measurement probability on the first carrier, the minimum measurement probability on the first carrier, and the maximum quantity of colliding carriers that collide with the first carrier are determined, the set of the one or more measurement gaps in which the one or more measurement windows of the first carrier are located may be first determined. The measurement window may be a part of or all of measurement windows of the first carrier. In other words, the set of the one or more measurement gaps in which the one or more measurement windows of the first carrier are located may be a set of one or more measurement gaps in which a part of or all of the measurement windows of the first carrier are located. The set of the one or more measurement gaps in which the one or more measurement windows of the first carrier are located may include one or more measurement gaps. Descriptions are provided by using an example, shown in FIG. 4, in which the first carrier is the carrier 1. Measurement gaps in which measurement windows of the carrier 1 are located are a measurement gap 0, a measurement gap 1, a measurement gap 2, a measurement gap 3, and the like. In other words, each measurement gap includes the measurement window of the first carrier. When the set of the one or more measurement gaps in which the one or more measurement windows of the first carrier are located is determined, the measurement gaps 0 to 3 may be assigned into the set, in other words, the set includes the measurement gaps 0, 1, 2, and 3. It should be understood that a quantity of measurement gaps included in the set may alternatively be another value, for example, 5, 6, more, or less. The measurement gaps included in the set may alternatively be discontinuous. For example, the set includes the measurement gap 0, the measurement gap 2, a measurement gap 5, and a measurement gap 7. In an implementation, the quantity of measurement gaps included in the set may be determined based on a period of the measurement window of the first carrier and a period of the measurement gap. For example, the quantity of measurement gaps included in the set may be a quantity of measurement gaps included in a time length that is an integer multiple of a larger value of the period of the measurement window of the first carrier and the period of the measurement gap. For example, the period of the measurement window of the first carrier is 20 ms, the period of the measurement gap is 40 ms, 4*40 ms, namely, 160 ms, is taken as the time length, and a quantity of measurement gaps included in the time length of 160 ms is determined as 4. In this case, it may be determined that the set of the one or more measurement gaps in which the one or more measurement windows of the first carrier are located includes four measurement gaps. Alternatively, in another implementation, the set may alternatively include the measurement gaps in which all the measurement windows of the first carrier are located. A manner of determining the set of the one or more measurement gaps in which the one or more measurement windows of the first carrier are located is not limited in this application.

In S220, the terminal device may determine the one or more of the average measurement probability on the first carrier, the minimum measurement probability on the first carrier, or the maximum quantity of colliding carriers that collide with the first carrier in the set based on the determined set of the one or more measurement gaps in which the one or more measurement windows of the first carrier are located. In other words, the average measurement probability on the first carrier, the minimum measurement probability on the first carrier, and the maximum quantity of colliding carriers that collide with the first carrier are respectively the average measurement probability, the minimum measurement probability, and the maximum quantity of colliding carriers in the measurement gap set. The measurement requirement on the first carrier is determined based on the one or more of the determined average measurement probability on the first carrier, the determined minimum measurement probability on the first carrier, or the determined maximum quantity of colliding carriers of the first carrier.

It should be understood that in this embodiment of this application, the average measurement probability on the first carrier, the minimum measurement probability on the first carrier, and the maximum quantity of colliding carriers that collide with the first carrier may alternatively be determined in another manner other than the manner of determining the average measurement probability on the first carrier, the minimum measurement probability on the first carrier, and the maximum quantity of colliding carriers that collide with the first carrier based on the set of the one or more measurement gaps in which the one or more measurement windows of the first carrier are located. For example, the average measurement probability on the first carrier, the minimum measurement probability on the first carrier, and the maximum quantity of colliding carriers that collide with the first carrier may be separately determined in preset duration. This is not limited in this embodiment of this application.

Figure 7:
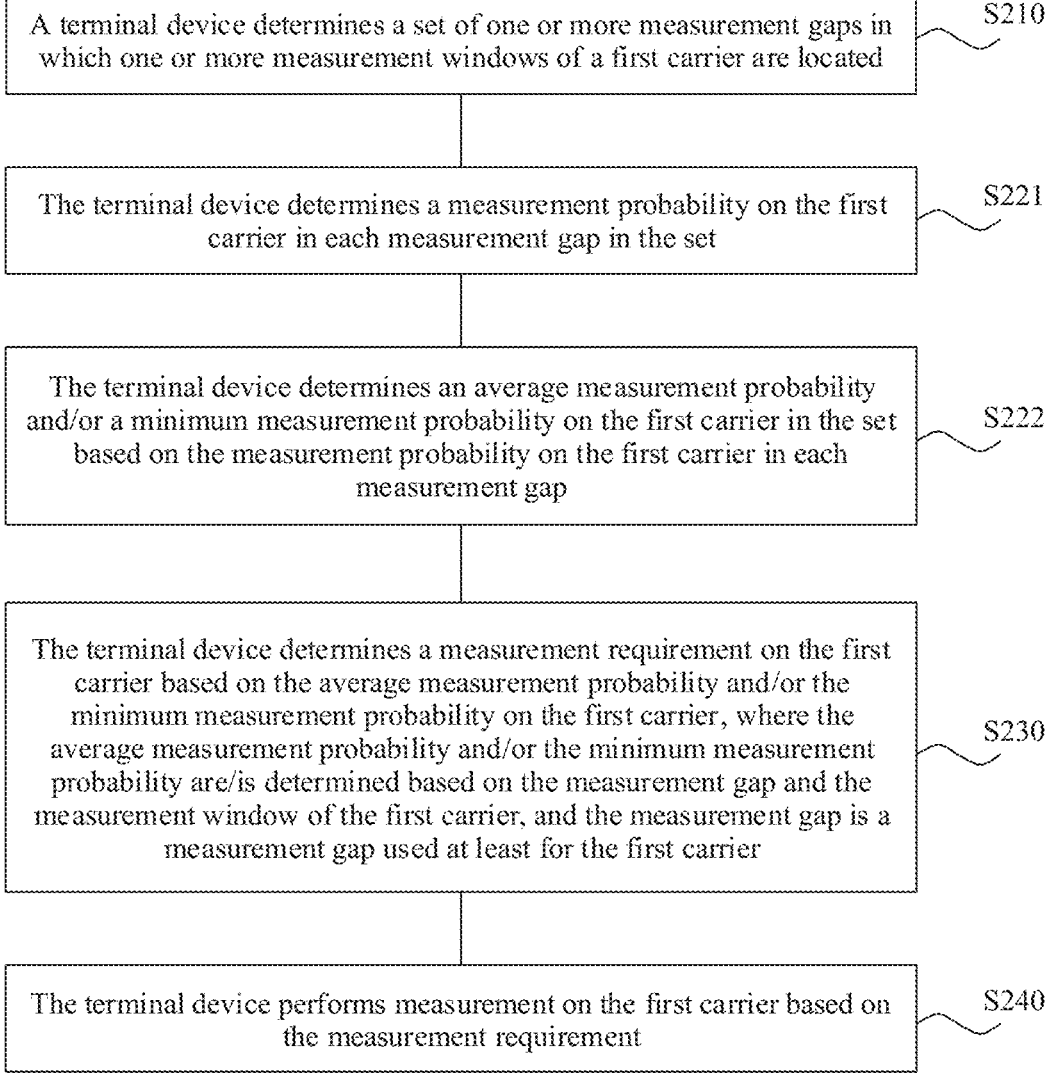
FIG. 7 is a schematic flowchart of a method for measurement on a carrier according to an embodiment of this application.

Optionally, in an embodiment, as shown in FIG. 7, in S220, the terminal device may determine the average measurement probability and/or the minimum measurement probability on the first carrier in the set based on the determined set of the one or more measurement gaps in which the one or more measurement windows of the first carrier are located. Specifically, that the terminal device determines the average measurement probability and/or the minimum measurement probability on the first carrier in the set includes the following steps:

S221: The terminal device determines a measurement probability on the first carrier in each measurement gap in the set.

S222: The terminal device determines the average measurement probability and/or the minimum measurement probability on the first carrier in the set based on the measurement probability on the first carrier in each measurement gap.

Specifically, after the set of the one or more measurement gaps in which the one or more measurement windows of the first carrier are located is determined, in S221, the measurement probability on the first carrier in each measurement gap in the set may be determined. The measurement probability on the first carrier in each measurement gap may be determined based on a total quantity of carrier(s) on which measurement needs to be performed in the measurement gap. The minimum measurement probability on the first carrier is a smallest measurement probability on the first carrier in a plurality of measurement gaps included in the set.

Descriptions are provided by using an example, shown in FIG. 4, in which the first carrier is the carrier 1 and a set of the measurement gaps in which the measurement windows of the carrier 1 are located is the measurement gaps 0, 1, 2, and 3. In other words, measurement probabilities on the first carrier in the measurement gaps 0, 1, 2, and 3 are separately determined. In S222, the average measurement probability and/or the minimum measurement probability on the first carrier in the set are/is determined based on the measurement probability on the first carrier in each measurement gap in the set. For example, measurement probabilities on the first carrier in all or some of the measurement gaps included in the set may be averaged, to obtain the average measurement probability on the first carrier in the set. Alternatively, measurement probabilities on the first carrier in all or some of the measurement gaps included in the set may be weighted and then averaged. For example, it is assumed that the measurement probabilities on the first carrier in the measurement gaps 0, 1, 2, and 3 are respectively 0.2, 0.3, 0.5, and 0.2. In this case, the average measurement probability on the first carrier in the set is (0.2+0.3+0.5+0.2)/4=0.3. For the minimum measurement probability on the first carrier, a smallest measurement probability on the first carrier in all or some of the measurement gaps included in the set may be determined as the minimum measurement probability. For example, it is assumed that the measurement probabilities on the first carrier in the measurement gaps 0, 1, 2, and 3 are respectively 0.2, 0.3, 0.5, and 0.2. In this case, the minimum measurement probability on the first carrier in the set is 0.2.

It should be understood that in this embodiment of this application, the average measurement probability and/or the minimum measurement probability on the first carrier in the set may alternatively be determined in another manner other than the manner of determining the average measurement probability and/or the minimum measurement probability on the first carrier in the set based on the measurement probability on the first carrier in each measurement gap in the set. For example, the average measurement probability and/or the minimum measurement probability on the first carrier in the set are/is determined based on measurement probabilities on the first carrier in some measurement gaps in the set; or the average measurement probability and/or the minimum measurement probability on the first carrier in the set are/is determined based on a quantity of the measurement gaps included in the set. This is not limited in this embodiment of this application.

Optionally, in an embodiment, in S221, the determining, by the terminal device, a measurement probability on the first carrier in each measurement gap in the set includes:

determining, by the terminal device, a quantity of colliding carriers in each measurement gap in the set; and determining, by the terminal device, the measurement probability on the first carrier in each measurement gap in the set based on the quantity of colliding carriers in each measurement gap.

Specifically, when determining the measurement probability on the first carrier in each measurement gap in the set, the terminal device may first determine the quantity of colliding carriers in each measurement gap in the set, namely, a total quantity of carrier(s) that collide with the first carrier in measurement in each measurement gap. The quantity of colliding carriers in each measurement gap in the set may be understood as a quantity of carriers on which measurement needs to be performed by the terminal device in a same measurement gap, namely, a quantity of carriers whose measurement windows are in a same measurement gap. For example, if measurement windows of four different carriers are in a same measurement gap, it is considered that a quantity of colliding carriers in the measurement gap is 4. The measurement probability on the first carrier in each measurement gap in the set is determined based on the quantity of colliding carriers in each measurement gap.

Optionally, the quantity of colliding carriers may be a total quantity of carrier(s) that collide with the measurement window of the first carrier in each measurement gap in the set. Descriptions are provided by using the example, shown in FIG. 4, in which the first carrier is the carrier 1 and the set of the measurement gaps in which the measurement windows of the carrier 1 are located is the measurement gaps 0, 1, 2, and 3. For the measurement gap 0, there are three carriers whose measurement windows are in the measurement gap 0, and the three carriers are respectively the carrier 1, the carrier 2, and the carrier 3. In other words, the measurement windows of the carrier 1, the carrier 2, and the carrier 3 are all in the measurement gap 0. It means that in the measurement gap 0, the terminal device needs to respectively receive or detect signals on the carrier 1, the carrier 2, and the carrier 3 in the measurement windows of the carrier 1, the carrier 2, and the carrier 3. In other words, in the measurement gap 0, there are three carriers that collide with the measurement window of the first carrier in total. In this case, in the measurement gap 0, a measurement probability on the first carrier is 1/3, namely, a reciprocal of a total quantity of colliding carriers.

It should be understood that, when the total quantity of carriers that collide with the measurement window of the first carrier in the measurement gap is determined, the first carrier may alternatively not be counted in the total quantity of carriers that collide with the measurement window of the first carrier. For example, for the measurement gap 0 in the foregoing example, there are measurement windows of two carriers, the carrier 2 and the carrier 3, in the measurement gap 0 other than the measurement window of the first carrier. In other words, the measurement windows of the carrier 2 and the carrier 3 are both in the measurement gap 0. In the measurement gap 0, there are two carriers that collide with the measurement window of the first carrier in total. In this case, in the measurement gap 0, the measurement probability on the first carrier may also be 1/3, namely, a reciprocal of a number obtained by adding 1 to the total quantity of carriers that collide with the first carrier.

It should be further understood that, if only the measurement window of the first carrier exists in a measurement gap, to be specific, in the measurement gap, the terminal device needs to perform measurement only on the first carrier, in the measurement gap, there is one carrier that collides with the measurement window of the first carrier in total. Alternatively, when the first carrier is not counted in the total quantity of carriers that collide with the first carrier, the total quantity of carriers that collide with the measurement window of the first carrier is 0. In the measurement gap, a measurement probability on the first carrier is 1.

It should be further understood that, when the quantity of colliding carriers in each measurement gap in the set is determined, to be specific, when the total quantity of carriers that collide with the measurement window of the first carrier in each measurement gap in the set is determined, the first carrier may be counted in the total quantity of carriers that collide with the measurement window of the first carrier, or may not be counted in the total quantity of carriers that collide with the measurement window of the first carrier. This is not limited in this embodiment of this application.

Figure 8:
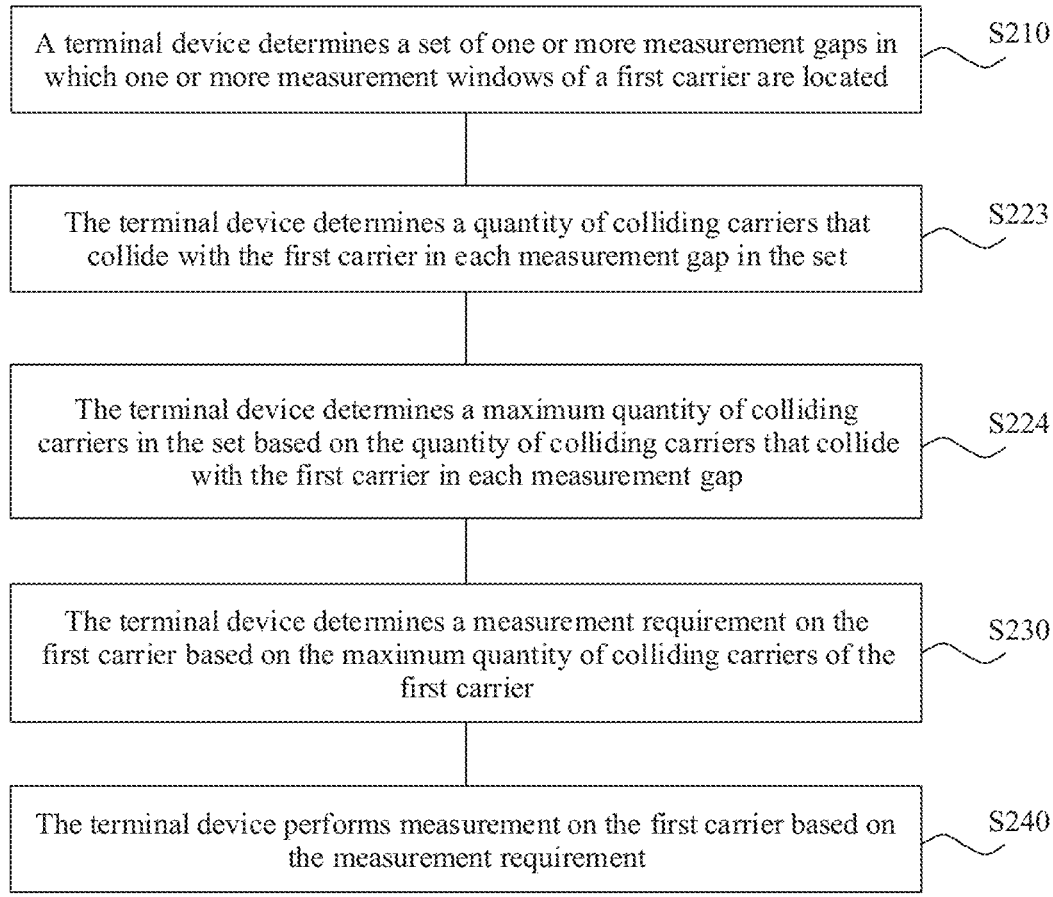
FIG. 8 is a schematic flowchart of a method for measurement on a carrier according to an embodiment of this application.

In an embodiment, as shown in FIG. 8, in S220, the terminal device may determine, based on the determined set of the one or more measurement gaps in which the one or more measurement windows of the first carrier are located, the maximum quantity of colliding carriers that collide with the first carrier in the set. Specifically, that the terminal device determines the maximum quantity of colliding carriers that collide with the first carrier in the set includes the following steps:

S223: The terminal device determines a quantity of colliding carriers in each measurement gap in the set.

S224: The terminal device determines the maximum quantity of colliding carriers in the set based on the quantity of colliding carriers in each measurement gap.

Specifically, when determining the maximum quantity of colliding carriers that collide with the first carrier in the set, the terminal device may first determine the quantity of colliding carriers in each measurement gap in the set. In other words, in each measurement gap, a total quantity of carrier(s) that collide with the first carrier in measurement is determined. The quantity of colliding carriers in each measurement gap in the set may be understood as a quantity of carriers on which measurement needs to be performed by the terminal device in a same measurement gap. In other words, the quantity of colliding carriers in each measurement gap may be understood as a quantity of carriers whose measurement windows are in a same measurement gap. For example, if measurement windows of four different carriers are in a same measurement gap, it is considered that a quantity of colliding carriers in the measurement gap is 4. In S224, the terminal device determines the maximum quantity of colliding carriers in the set based on the quantity of colliding carriers in each measurement gap.

Descriptions are provided by using the example, shown in FIG. 4, in which the first carrier is the carrier 1 and the set of the measurement gaps in which the measurement windows of the carrier 1 are located is the measurement gaps 0, 1, 2, and 3. For the measurement gap 0, there are three carriers whose measurement windows are in the measurement gap 0, and the three carriers are respectively the carrier 1, the carrier 2, and the carrier 3. In other words, the measurement windows of the carrier 1, the carrier 2, and the carrier 3 are all in the measurement gap 0. It means that in the measurement gap 0, the terminal device needs to respectively receive or detect signals on the carrier 1, the carrier 2, and the carrier 3 in the measurement windows of the carrier 1, the carrier 2, and the carrier 3. In other words, in the measurement gap 0, there are three carriers that collide with the measurement window of the first carrier in total. Similarly, for the measurement gaps 1 to 3, there are three carriers that collide with the measurement window of the first carrier in each measurement gap in total. In this case, the maximum quantity of colliding carriers that collide with the first carrier in the measurement gap set is 3. It is assumed that there are three carriers that collide with the measurement window of the first carrier in the measurement gap 0 in total, there are four carriers that collide with the measurement window of the first carrier in the measurement gap 1 in total, there are three carriers that collide with the measurement window of the first carrier in the measurement gap 2 in total, and there are six carriers that collide with the measurement window of the first carrier in the measurement gap 3 in total. In this case, the maximum quantity of colliding carriers that collide with the first carrier in the measurement gap set is 6.

It should be understood that, when the total quantity of carriers that collide with the measurement window of the first carrier in each measurement gap is determined, the first carrier may alternatively not be counted in the total quantity of carriers that collide with the measurement window of the first carrier.

Optionally, in an embodiment, the collision includes: a part or all of the measurement window of the first carrier and a part or all of a measurement window of at least one carrier are in one measurement gap in the set.

Specifically, when a total quantity of carrier(s) that collide with the measurement window of the first carrier in a measurement gap is determined, a condition for determining a collision in the measurement gap may be that a part or all of the measurement window of the first carrier and a part or all of a measurement window of at least one carrier are in one measurement gap in the set. The measurement gap is applicable to the at least one carrier, and the at least one carrier includes the first carrier. As shown in FIG. 4, descriptions are provided by using the example in which the first carrier is the carrier 1 and the set of the measurement gaps in which the measurement windows of the carrier 1 are located is the measurement gaps 0, 1, 2, and 3. The at least one carrier is the carriers 1 to 5. The third measurement window of the carrier 1, the second measurement window of the carrier 2, and the first measurement window of the carrier 4 are in a same measurement gap (the measurement gap 1). In this case, it is considered that in the measurement gap 1, the carrier 1 collides with the carrier 2 and the carrier 3, and a total quantity of colliding carriers is 3. In this case, a measurement probability on the carrier 1 is 1/3 in the measurement gap 1.

FIG. 4 shows that all the third measurement window of the carrier 1, all the second measurement window of the carrier 2, and all the first measurement window of the carrier 3 are in the measurement gap 1. Alternatively, a part of the third measurement window of the carrier 1 and a part of the second measurement window of the carrier 2 and/or a part of the first measurement window of the carrier 4 may be in the measurement gap 1. In other words, the third measurement window of the carrier 1 may be partially in the measurement gap 1, the second measurement window of the carrier 2 may be partially in the measurement gap 1, and the first measurement window of the carrier 3 may also be partially in the measurement gap 1. In this case, it is also considered that the measurement window of the first carrier is in a same measurement gap with the measurement windows of the carrier 2 and the carrier 3. In other words, in the measurement gap 1, the carrier 1 collides with the carrier 2 and the carrier 3, and a total quantity of colliding carriers is also 3.

It should be understood that, in this embodiment of this application, a carrier that collides with the first carrier may alternatively be determined by using another condition other than the condition that a part or all of the measurement window of the first carrier and a part or all of a measurement window of at least one carrier are in one measurement gap in the set. For example, a collision is determined by using a condition that a time-frequency resource of the measurement window of the first carrier partially or completely overlaps a time-frequency resource of a measurement window of at least one carrier. This is not limited in this embodiment of this application.

Optionally, in an embodiment, the measurement window includes one or more of a start position of the measurement window, duration of the measurement window, and a period of the measurement window; and/or, the measurement gap includes one or more of a start position of the measurement gap, duration of the measurement gap, and a period of the measurement gap.

Specifically, for each carrier, the network device configures a corresponding measurement window, to indicate the terminal device to measure, receive, or perform another operation on a signal on the carrier in the measurement window. Therefore, the measurement window further includes the at least one of the start position of the measurement window, the duration of the measurement window, and the period of the measurement window. The terminal device may determine, based on information such as the start position of the measurement window and the duration of the measurement window of each carrier, a time point at which measurement needs to be performed, a length of a measurement time, and the like. Using an example in FIG. 3 for description, the start position of the measurement window is equivalent to a start position of an SSB receive window, the duration of the measurement window is equivalent to a length of the SSB receive window, and the period of the measurement window is equivalent to an SMTC period.

The measurement gap is applicable to the one or more carriers. The terminal device may perform, based on the measurement gap, a cell identification operation, a cell measurement operation, or another operation on the one or more carriers in a time segment whose time length is a measurement gap length. The measurement gap further includes the at least one of the start position of the measurement gap, the duration of the measurement gap, and the period of the measurement gap, to notify the terminal device that the terminal device can perform signal measurement or another operation on the one or more carriers in these measurement gaps. The start position of the measurement gap is used by the terminal device to determine a position of the measurement gap. The duration of the measurement gap is equal to a time length of the measurement gap. The period of the measurement gap is equal to a time length between every two measurement gaps. For example, as shown in FIG. 4, the period of the measurement gap (a measurement gap repetition period) is 40 ms. When the measurement window and the measurement gap include the foregoing content, the average measurement probability on the first carrier, the minimum measurement probability on the first carrier, and the maximum quantity of colliding carriers that collide with the first carrier that are determined by the terminal device can more accurately and truly reflect a feature of the first carrier. Accuracy of the measurement requirement on the first carrier is improved, so that the measurement requirement can more truly reflect fairness and competitiveness of measurement opportunities on different carriers.

It should be understood that the measurement window may further include other information related to the measurement window. The measurement gap may further include other information related to the measurement gap. This is not limited in this embodiment of this application.

The following describes in detail, with reference to a specific example, a process of determining the average measurement probability on the first carrier, the minimum measurement probability on the first carrier, and the maximum quantity of colliding carriers that collide with the first carrier.

Descriptions are provided by using the example, shown in FIG. 4, in which the first carrier is the carrier 1 and the set of the measurement gaps in which the measurement windows of the carrier 1 are located is the measurement gaps 0, 1, 2, and 3. The set includes four measurement gaps. For the measurement gap 0, if there are three carriers that collide with the measurement window of the carrier 1 in total, a measurement probability of an SSB on the carrier 1 is 1/3. For each of the measurement gaps 1 to 3, there are three carriers that collide with the measurement window of the carrier 1 in each measurement gap in total. In other words, for each of the measurement gaps 1 to 3, a measurement probability of the SSB on the carrier 1 is 1/3, and an average measurement probability of the SSB on the carrier 1 in the set is (1/3+1/3+1/3+1/3)/4=1/3. A minimum measurement probability of the SSB on the carrier 1 in the set is min(1/3+1/3+1/3+1/3)=1/3. The maximum quantity of colliding carriers that collide with the first carrier in the measurement gap set is 3.

Figure 9:
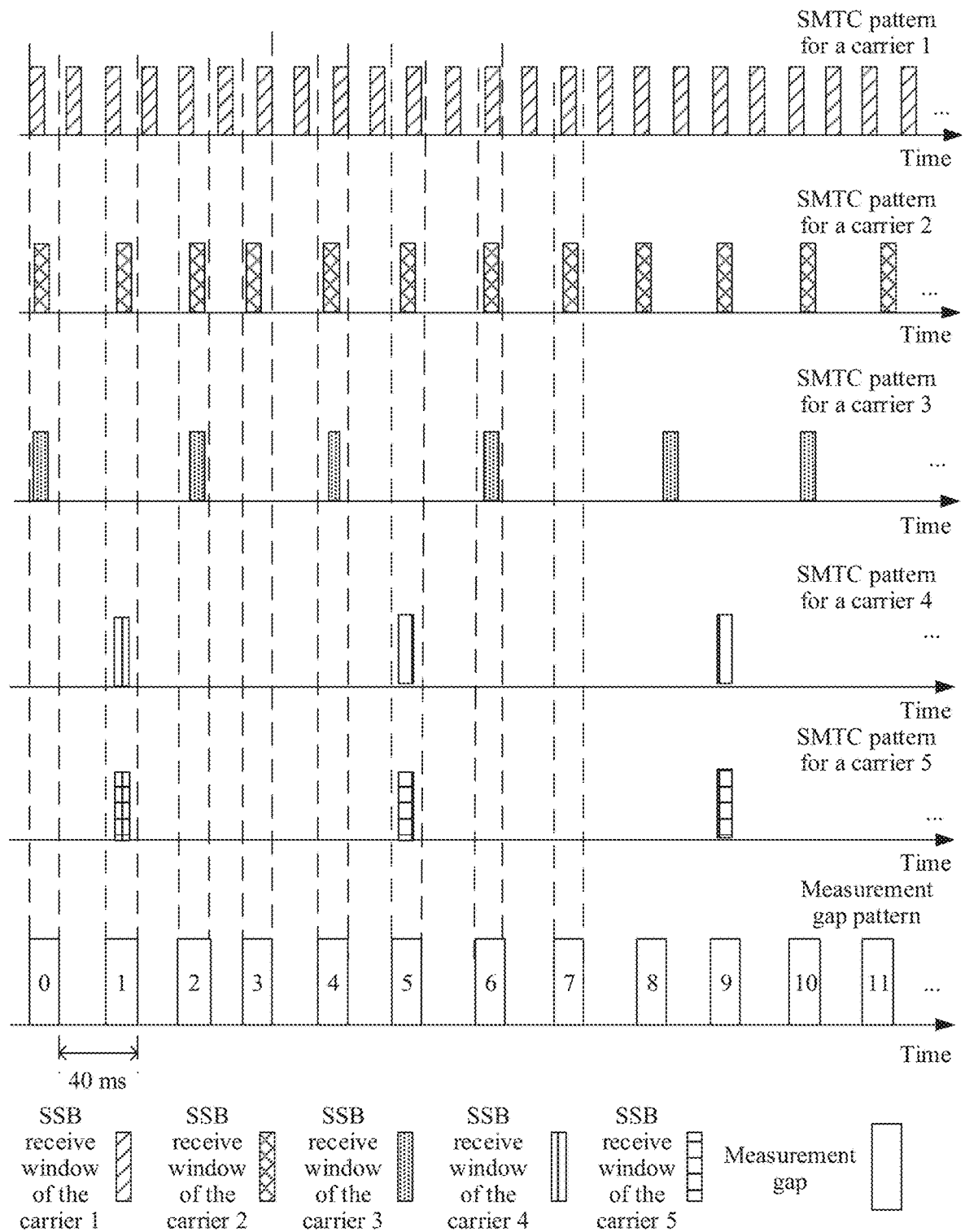
FIG. 9 is a schematic diagram of a measurement gap pattern configured for a carrier according to another embodiment of this application.

Alternatively, descriptions are provided by using an example, shown in FIG. 9, in which the first carrier is the carrier 2 and a set of measurement gaps in which measurement windows of the carrier 2 are located is measurement gaps 0, 1, 2, 3, 4, 5, 6, and 7. For each of the measurement gaps 0, 2, 4, and 6, there are three carriers that collide with the measurement window of carrier 2 in total, and a measurement probability of an SSB on the carrier 2 is 1/3. For the measurement gaps 1 and 5, there are four carriers that collide with the measurement window of the carrier 2 in total, and a measurement probability of an SSB on the carrier 2 is 1/4. For the measurement gaps 3 and 7, there are two carriers that collide with the measurement window of the carrier 2 in total, and a measurement probability of an SSB on the carrier 2 is 1/2. An average measurement probability of the SSB on the carrier 2 in the measurement gap set is (1/3+1/4+1/3+1/2+1/3+1/4+1/3+1/2)/8=13/48. A minimum measurement probability of the SSB on the carrier 2 in the measurement gap set is 1/4. A maximum quantity of colliding carriers that collide with the first carrier in the measurement gap set is 4.

It should be understood that the foregoing two examples are merely examples, and should not constitute any limitation on this embodiment of this application. For example, measurement gaps included in the measurement gap set may alternatively be discontinuous. Alternatively, the measurement gap set may include more or fewer measurement gaps. This is not limited in this embodiment of this application.

Figure 10:
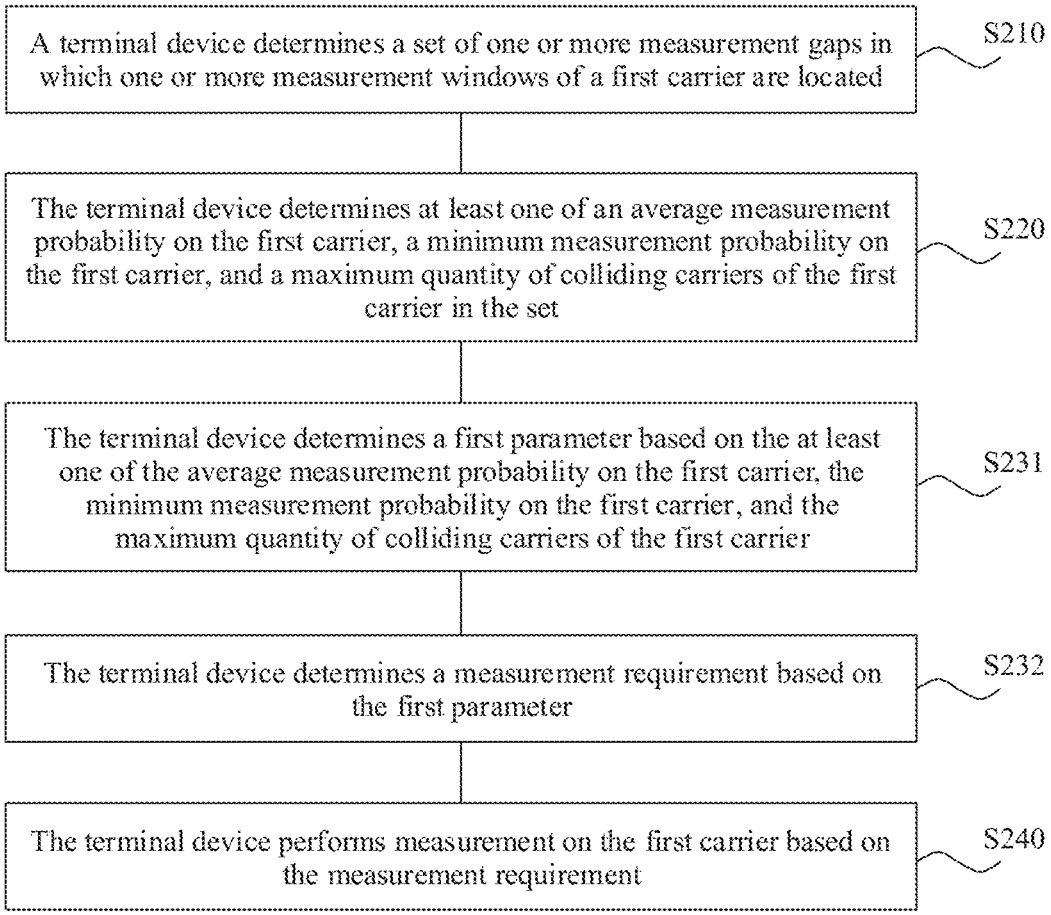
FIG. 10 is a schematic flowchart of a method for measurement on a carrier according to another embodiment of this application.

Optionally, in an embodiment, as shown in FIG. 10, in S230, the determining, by a terminal device, a measurement requirement on a first carrier based on at least one of an average measurement probability on the first carrier, a minimum measurement probability on the first carrier, and a maximum quantity of colliding carriers of the first carrier includes the following steps:

S231: The terminal device determines a first parameter based on the at least one of the average measurement probability on the first carrier, the minimum measurement probability on the first carrier, and the maximum quantity of colliding carriers that collide with the first carrier.

S232: The terminal device determines the measurement requirement based on the first parameter.

Specifically, after the one or more of the average measurement probability on the first carrier, the minimum measurement probability on the first carrier, and the maximum quantity of colliding carriers that collide with the first carrier in the measurement gap set are determined, the first parameter may be first determined based on the one or more of the average measurement probability, the minimum measurement probability, and the maximum quantity of colliding carriers, and then the measurement requirement on the first carrier is determined based on the first parameter. In other words, the one or more of the average measurement probability, the minimum measurement probability, and the maximum quantity of colliding carriers may be first corrected, and the measurement requirement on the first carrier is determined by using the first parameter obtained after the correction. In this way, the measurement requirement can be determined more accurately, in other words, the determined measurement requirement is more accurate, so that accuracy of measurement performed by the terminal device based on the measurement requirement is improved, and communication efficiency and user experience of the terminal device are improved.

Optionally, in a specific implementation, in S231, the determining, by the terminal device, a first parameter based on the at least one of the average measurement probability on the first carrier, the minimum measurement probability on the first carrier, and the maximum quantity of colliding carriers that collide with the first carrier includes:

determining, by the terminal device, a reciprocal of the average measurement probability or a reciprocal of the minimum measurement probability on the first carrier as the first parameter.

Specifically, when the first parameter is determined based on the average measurement probability or the minimum measurement probability, the reciprocal of the average measurement probability or the reciprocal of the minimum measurement probability may be determined as the first parameter. For example, if the average measurement probability on the first carrier in the measurement gap set is 1/3, the first parameter is 3. The reciprocal of the average measurement probability or the reciprocal of the minimum measurement probability is determined as the first parameter, so that the terminal device can quickly and accurately determine the first parameter, to improve efficiency of determining the first parameter, and further improve efficiency of determining the measurement requirement by the terminal device, thereby improving user experience.

It should be understood that in this embodiment of this application, the first parameter may alternatively be a reciprocal of a square of the average measurement probability or a reciprocal of a square of the minimum measurement probability. Alternatively, the first parameter may be directly the average measurement probability or the minimum measurement probability. Alternatively, the first parameter may be a square value of the average measurement probability or a square value of the minimum measurement probability. Alternatively, the first parameter may be a value obtained by adding a constant to the reciprocal of the average measurement probability or to the reciprocal of the minimum measurement probability, or may be a value obtained by multiplying a constant by the reciprocal of the average measurement probability or by the reciprocal of the minimum measurement probability. A value range of the constant is a positive number greater than 0. For example, the constant may be 3 or 5. Alternatively, the first parameter may meet another functional relationship with the average measurement probability or the minimum measurement probability. Further, the function may be a function related to a parameter of the first carrier, or may be another function. The parameter of the first carrier may include a parameter of a frequency domain range (for example, a frequency domain value of a frequency domain center position) or a parameter of a time domain range (a quantity of symbols occupied in time domain or the like) of the first carrier, may include a measurement period of the first carrier, the measurement gap, or the like, or may include another parameter related to the first carrier. A process of determining the first parameter based on the average measurement probability or the minimum measurement probability is not limited in this embodiment of this application.

It should be understood that in this embodiment of this application, the measurement requirement may alternatively be directly determined based on the average measurement probability or the minimum measurement probability. This is not limited in this embodiment of this application.

Optionally, in an embodiment, the terminal device may alternatively determine the first parameter based on the average measurement probability and the minimum measurement probability on the first carrier. For example, the first parameter may meet a functional relationship with the average measurement probability and the minimum measurement probability. In other words, the first parameter is determined by using the average measurement probability and the minimum measurement probability. The functional relationship may be that the first parameter is the reciprocal of the average measurement probability plus the reciprocal of the minimum measurement probability. The functional relationship may alternatively be that the first parameter is a multiple of the average measurement probability plus the reciprocal of the minimum measurement probability, or there may be another case. It should be understood that the first parameter may alternatively meet another functional relationship with the average measurement probability and the minimum measurement probability. Further, the function may be a function related to a parameter of the first carrier, or may be another function. A process of determining the first parameter based on the average measurement probability and the minimum measurement probability is not limited in this embodiment of this application.

Optionally, in another specific implementation, in S231, the determining, by the terminal device, a first parameter based on the at least one of the average measurement probability on the first carrier, the minimum measurement probability on the first carrier, and the maximum quantity of colliding carriers that collide with the first carrier includes:

determining, by the terminal device, the maximum quantity of colliding carriers that collide with the first carrier as the first parameter.

Specifically, when the first parameter is determined based on the maximum quantity of colliding carriers, the maximum quantity of colliding carriers may be determined as the first parameter. For example, if the maximum quantity of colliding carriers that collide with the first carrier in the measurement gap set is 3, the first parameter is 3. The maximum quantity of colliding carriers is determined as the first parameter, so that the terminal device can quickly and accurately determine the first parameter, to improve efficiency of determining the first parameter, and further improve efficiency of determining the measurement requirement by the terminal device, thereby improving user experience.

It should be understood that in this embodiment of this application, the first parameter may alternatively be a square value of the maximum quantity of colliding carriers. Alternatively, the first parameter may be a value obtained by adding a constant to the maximum quantity of colliding carriers, or may be a value obtained by multiplying a constant by the maximum quantity of colliding carriers. A value range of the constant is a positive number greater than 0. For example, alternatively, the first parameter and the maximum quantity of colliding carriers may meet another functional relationship. Further, the function may be a function related to a parameter of the first carrier, or may be another function. The parameter of the first carrier may include a parameter of a frequency domain range (for example, a frequency domain value of a frequency domain center position) or a parameter of a time domain range (a quantity of symbols occupied in time domain or the like) of the first carrier, may include a measurement period of the first carrier, the measurement gap, or the like, or may include another parameter related to the first carrier. A process of determining the first parameter based on the maximum quantity of colliding carriers is not limited in this embodiment of this application.

It should be further understood that the terminal device may alternatively determine the first parameter based on the maximum quantity of colliding carriers and with reference to one or both of the average measurement probability and the minimum measurement probability. For example, the first parameter may meet a functional relationship with the average measurement probability, the minimum measurement probability, and the maximum quantity of colliding carriers. In other words, the first parameter is determined by using the average measurement probability, the minimum measurement probability, and the maximum quantity of colliding carriers. For example, the functional relationship may be that the first parameter is a sum of the reciprocal of the average measurement probability, the reciprocal of the minimum measurement probability, and the maximum quantity of colliding carriers. It should be understood that the first parameter may alternatively meet another functional relationship with the average measurement probability, the minimum measurement probability, and the maximum quantity of colliding carriers. Further, the function may be a function related to a parameter of the first carrier, or may be another function. A process of determining the first parameter based on the average measurement probability, the minimum measurement probability, and the maximum quantity of colliding carriers is not limited in this embodiment of this application.

Optionally, in an embodiment, the determining, by the terminal device, the measurement requirement based on the first parameter includes:

determining the measurement requirement according to the following formula (1):

$$S = \mathrm{Max}(T1, T2) * \lceil R * A \rceil \quad (1)$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and ⌈R*A⌉ indicates rounding up a product of R and A. For example, if the product of R and A is 0.91, ⌈R*A⌉ is 1, and A is the first parameter determined based on the one or more of the average measurement probability on the first carrier, the minimum measurement probability on the first carrier, and the maximum quantity of colliding carriers that collide with the first carrier.

Specifically, the terminal device may calculate, according to the formula (1), the value of the measurement counter corresponding to the measurement requirement. R is the quantity of measurement opportunities that corresponds to the measurement requirement, T1 is the period of the measurement window of the first carrier, and different carriers may correspond to different periods of measurement windows. T2 is the period of the measurement gap applicable to the one or more carriers, and the one or more carriers include the first carrier. The value of Max(T1, T2) is the larger value of T1 and T2, and A is the first parameter. ⌈R*A⌉ indicates rounding up the product of R and A.

Descriptions are provided by using the example, shown in FIG. 4, in which the first carrier is the carrier 1 and the set of the measurement gaps in which the measurement windows of the carrier 1 are located is the measurement gaps 0, 1, 2, and 3. A period of the measurement window of the first carrier is 20 ms, in other words, a value of T1 is 20 ms. T2 is a period of the measurement gap used for the five carriers, in other words, for the carriers 1 to 5, a value of T2 is 40 ms. In this case, the value of Max(T1, T2) is 40 ms. It can be learned from the foregoing that the average measurement probability on the first carrier in the set is 1/3, the minimum measurement probability on the first carrier in the set is 1/3, and the maximum quantity of colliding carriers that collide with the first carrier in the measurement gap set is 3.

It is assumed that the first parameter is the reciprocal of the average measurement probability or the reciprocal of the minimum measurement probability. In this case, the first parameter is 3. It is assumed that the first parameter is the maximum quantity of colliding carriers. In this case, the first parameter is also 3. It is assumed that R is 5, and the value of the measurement counter of the measurement requirement on the first carrier may be calculated based on the values of the parameters. Similarly, for the carriers 2 to 5, the foregoing method may be used to calculate a value of a measurement counter of a measurement requirement corresponding to each carrier.

In the formula (1), R may represent the quantity of the required measurement opportunities that corresponds to the measurement requirement. For example, if the measurement requirement (the measurement counter) is a cell identification time/delay, R represents a quantity of measurement opportunities required in the cell identification time. If the measurement requirement is a detection time of a primary synchronization signal (Primary Synchronization Signal, PSS)/secondary synchronization signal (Secondary Synchronization Signal, SSS), R represents a quantity of measurement opportunities required in the detection time of the PSS/SSS. If the measurement counter is an SSB index detection time, R represents a quantity of measurement opportunities required in the SSB index detection time. If the measurement requirement is an SSB measurement period, R represents a quantity of measurement opportunities required in a time of obtaining an SSB measurement result. It should be understood that, for different carriers, values of R may be the same or different. For different measurement counters, values of R may be the same or different.

It should be understood that, a formula (1) variation other than the formula (1) may alternatively be used; or a constant may be added to the formula (1); or there may be another case. For example, the measurement requirement may alternatively be determined by using the following formula (2):

$$S=\text{Max}(T1,T2)*\lceil R*A*d\rceil \quad (2)$$

In the formula (2), d is a coefficient, and the coefficient may be notified by the network device to the terminal device, or may be determined by the terminal device, d may be related to the parameter of the first carrier, or may be a constant. A value range of the constant is a positive integer greater than 0. This is not limited in this embodiment of this application.

Optionally, in an embodiment, the determining, by the terminal device, the measurement requirement based on the first parameter includes:
  determining the measurement requirement according to the following formula (3):

$$S=R*\text{Max}(T1,T2)*\lceil A\rceil \quad (3)$$

In the formula (3), S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and ⌈A⌉ indicates rounding up a value of A. For example, if the value of A is 0.1, ⌈A⌉ is 1, and A is the first parameter.

Specifically, the terminal device may calculate, according to the formula (3), the value of the measurement counter corresponding to the measurement requirement. R is the quantity of measurement opportunities that corresponds to the measurement requirement, and the definition of R is the same as that of R in the formula (1). T1 is the period of the measurement window of the first carrier, and different carriers may correspond to different periods of measurement windows. T2 is the period of the measurement gap applicable to the one or more carriers, and the one or more carriers include the first carrier. The value of Max(T1. T2) is the larger value of T1 and T2, and A is the first parameter determined based on the at least one of the average measurement probability on the first carrier, the minimum measurement probability on the first carrier, and the maximum quantity of colliding carriers that collide with the first carrier. Meanings of the parameters in the formula (3) are similar to those of the parameters in the formula (1). For corresponding descriptions, refer to the descriptions in the formula (1). For brevity, details are not described herein again.

It should be understood that, a formula (3) variation other than the formula (3) may alternatively be used; or a correction coefficient may be added to the formula (3); or there may be another case. For example, the measurement requirement may alternatively be determined by using the following formula (4):

$$S=R*\text{Max}(T1,T2)*\lceil A*k\rceil \quad (4)$$

In the formula (4), k is a coefficient, and the coefficient may be notified by the network device to the terminal device, or may be determined by the terminal device. k may be related to the parameter of the first carrier, or may be a constant. A value range of the constant is a positive integer greater than 0. This is not limited in this embodiment of this application.

Optionally, in an embodiment, the determining, by the terminal device, the measurement requirement based on the first parameter includes:

determining the measurement requirement according to the following formula (5):

$$S=R*\text{Max}(T1,T2)*\lceil A \rceil \qquad (5)$$

In the formula (5), S is a value of a measurement counter of the measurement requirement, R is a quantity of measurement opportunities that corresponds to the measurement requirement. T1 is the period of the measurement window, T2 is the period of the measurement gap, a value of Max(T1, T2) is a larger value of T1 and T2, and $\lceil A \rceil$ indicates rounding up a value of A. A is the first parameter.

Specifically, the terminal device may calculate, according to the formula (5), the value of the measurement counter corresponding to the measurement requirement. R is the quantity of measurement opportunities that corresponds to the measurement requirement. T1 is the period of the measurement window of the first carrier, and different carriers may correspond to different periods of measurement windows. T2 is the period of the measurement gap applicable to the one or more carriers, and the one or more carriers include the first carrier. The value of Max(T1, T2) is the larger value of T1 and T2, and A is the first parameter determined based on the at least one of the average measurement probability on the first carrier, the minimum measurement probability on the first carrier, and the maximum quantity of colliding carriers that collide with the first carrier. $\lceil A \rceil$ indicates rounding up the value of A. Meanings of the parameters in the formula (5) are similar to those of the parameters in the formula (1). For corresponding descriptions, refer to the descriptions in the formula (1). For brevity, details are not described herein again.

It should be understood that, a formula (5) variation other than the formula (5) may alternatively be used; or a correction coefficient may be added to the formula (5); or there may be another case. For example, the measurement requirement may alternatively be determined by using the following formula (6):

$$S=R*\text{Max}(T1,T2)*\lceil A*l \rceil \qquad (6)$$

In the formula (6), l is a coefficient, and the coefficient may be notified by the network device to the terminal device, or may be determined by the terminal device. l may be related to the parameter of the first carrier, or may be a constant. A value range of the constant is a positive integer greater than 0. This is not limited in this embodiment of this application.

Optionally, in an embodiment, the determining, by the terminal device, the measurement requirement based on the first parameter includes:

determining the measurement requirement according to the following formula (7):

$$S=R*\text{Max}(T1,T2)*A \qquad (7)$$

In the formula (7), S is a value of a measurement counter of the measurement requirement. R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

It should be understood that, a formula (7) variation other than the formula (7) may alternatively be used; or a correction coefficient may be added to the formula (7); or there may be another case. For example, the measurement requirement may alternatively be determined by using the following formula (8):

$$S=R*\text{Max}(T1,T2)*A*N \qquad (8)$$

In the formula (8). N is a coefficient, and the coefficient may be notified by the network device to the terminal device, or may be determined by the terminal device. N may be related to the parameter of the first carrier, or may be a constant. A value range of the constant is a positive integer greater than 0. This is not limited in this embodiment of this application.

Optionally, in an embodiment, the determining, by the terminal device, the measurement requirement based on the first parameter includes:

determining the measurement requirement according to the following formula (9):

$$S=\text{Max}(T1,T2)*\lceil R*A \rceil*C \qquad (9)$$

In the formula (9), S is a value of a measurement counter of the measurement requirement, R is a quantity of measurement opportunities that corresponds to the measurement requirement, and C is a coefficient that may be notified by the network device to the terminal device, or is a constant. A value range of the constant is a positive integer greater than 0. T1 is the period of the measurement window, T2 is the period of the measurement gap, a value of Max(T1, T2) is a larger value of T1 and T2, and A is the first parameter.

It should be understood that, a formula (9) variation other than the formula (9) may alternatively be used; or a correction coefficient may be added to the formula (9); or there may be another case. For example, the measurement requirement may alternatively be determined by using the following formula (10):

$$S=\text{Max}(T1,T2)*\lceil R*A*p \rceil*C \qquad (10)$$

In the formula (10), C and p are coefficients, and the coefficients may be notified by the network device to the terminal device, or may be determined by the terminal device. C and/or p may be related to the parameter of the first carrier, or may be a constant. A value range of the constant is a positive integer greater than 0. This is not limited in this embodiment of this application.

Optionally, in an embodiment, the determining, by the terminal device, the measurement requirement based on the first parameter includes:

determining the measurement requirement according to the following formula (11):

$$S=R*\text{Max}(T1,T2)*\lceil A \rceil*E \qquad (11)$$

In the formula (11), S is a value of a measurement counter of the measurement requirement, R is a quantity of measurement opportunities that corresponds to the measurement requirement, and E is a coefficient that may be notified by the network device to the terminal device, or is a constant. A value range of the constant is a positive integer greater than 0. T1 is the period of the measurement window, T2 is the period of the measurement gap, a value of Max(T1, T2) is a larger value of T1 and T2, and A is the first parameter.

It should be understood that, a formula (11) variation other than the formula (11) may alternatively be used; or a correction coefficient may be added to the formula (11); or there may be another case. For example, the measurement requirement may alternatively be determined by using the following formula (12):

$$S=R*\text{Max}(T1,T2)*\lceil A*q \rceil*E \qquad (12)$$

In the formula (12), E and q are coefficients, and the coefficients may be notified by the network device to the terminal device, or may be determined by the terminal device. E and/or q may be related to the parameter of the first carrier, or may be a constant. A value range of the constant is a positive integer greater than 0. This is not limited in this embodiment of this application.

Optionally, in an embodiment, the determining, by the terminal device, the measurement requirement based on the first parameter includes:

determining the measurement requirement according to the following formula (13):

$$S=H*A \qquad (13)$$

In the formula (13), H is a coefficient, and the coefficient may be notified by the network device to the terminal device, or may be determined by the terminal device. H may be related to the parameter of the first carrier, or may be a constant. A value range of the constant is a positive integer greater than 0. This is not limited in this embodiment of this application.

The value of the measurement counter of the measurement requirement is calculated by using each of the foregoing formulas, so that the measurement requirement can be quickly and accurately obtained, and carrier detection efficiency of the terminal device is improved, thereby improving user experience.

It should be understood that in this embodiment of this application, another formula other than the foregoing formulas may alternatively be used to calculate the value of the measurement counter of the measurement requirement. For example, a relationship among S, Max(T1, T2), A, and R may alternatively meet any possible form such as a quadratic function or an exponential function. This is not limited in this embodiment of this application.

Optionally, in an embodiment, the measurement window of the first carrier is a measurement window of a synchronization signal block SSB on the first carrier, and the measurement gap is a measurement gap used at least for the SSB on the first carrier.

Specifically, the measurement window of the first carrier may be the measurement window of the SSB on the first carrier, as shown in FIG. 3 or FIG. 4. The measurement window of the SSB may include a start position of the measurement window of the SSB, duration of the measurement window of the SSB, the SMTC period, and the like. The measurement gap may be a measurement gap of the SSB, and the period of the measurement gap may be a period of the measurement gap of the SSB. The measurement gap of the SSB may include at least one of a start position of the measurement gap of the SSB, duration of the measurement gap of the SSB, and a period of the measurement gap of the SSB.

It should be understood that the measurement window of the first carrier may alternatively be a measurement window of another reference signal on the first carrier, and the measurement gap may be a measurement gap used at least for the another reference signal on the first carrier. This is not limited in this embodiment of this application.

Optionally, in an embodiment, the measurement requirement includes at least one of the cell identification time or delay, a reference signal detection time, a reference signal index detection time, a reference signal measurement period, and a radio resource management RRM measurement period. For example, the value, of the measurement counter of the measurement requirement, that is calculated by using each of the foregoing formulas may be a value of the cell identification time, or a value of a reference signal index detection time. It should be understood that the measurement requirement may alternatively include other information or another counter. This is not limited in this embodiment of this application.

An embodiment of this application further provides a method for measurement on a carrier. FIG. 1I is a schematic flowchart of a method 300 for measurement on a carrier according to an embodiment of this application. The method 300 may be applied to the scenario shown in FIG. 1, and certainly may also be applied to another communication scenario. This is not limited in this embodiment of this application.

As shown in FIG. 11, the method 300 includes the following steps.

S310: A network device receives a measurement result on a first carrier, where the measurement result on the first carrier is determined based on a measurement requirement on the first carrier.

The measurement requirement on the first carrier is determined based on at least one of an average measurement probability on the first carrier, a minimum measurement probability on the first carrier, and a maximum quantity of colliding carriers that collide with the first carrier, the average measurement probability on the first carrier, the minimum measurement probability on the first carrier, and the maximum quantity of colliding carriers that collide with the first carrier are determined based on a measurement gap and a measurement window of the first carrier, and the measurement gap is a measurement gap used at least for the first carrier.

S320: The network device configures the first carrier based on the measurement result.

According to the method for measurement on a carrier that is provided in this application, for each carrier on which measurement is to be performed, a measurement requirement (a measurement counter) on the carrier on which measurement is to be performed is determined based on at least one of an average measurement probability on the carrier (the first carrier) on which measurement is to be performed, a minimum measurement probability on the carrier on which measurement is to be performed, and the maximum quantity of colliding carriers that collide with the first carrier. The at least one of the average measurement probability, the minimum measurement probability, and the maximum quantity of colliding carriers that collide with the first carrier is determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. The measurement result determined based on the measurement requirement can reflect a difference between carriers, so that the network device can more accurately configure different carriers based on measurement results on the different carriers, for example, reconfigures a measurement window corresponding to a carrier and a measurement gap, thereby improving communication efficiency and user experience.

Optionally, in an embodiment, the at least one of the average measurement probability, the minimum measurement probability, and the maximum quantity of colliding carriers is determined based on the measurement gap and a measurement window of each carrier in the one or more carriers, the measurement gap is a measurement gap applied to the one or more carriers, and the one or more carriers include the first carrier.

Optionally, in an embodiment, the average measurement probability on the first carrier, the minimum measurement probability on the first carrier, and the maximum quantity of colliding carriers that collide with the first carrier are respectively an average measurement probability on the first carrier, a minimum measurement probability on the first carrier, and a maximum quantity of colliding carriers of the first carrier in a set of one or more measurement gaps in which one or more measurement windows of the first carrier are located.

Optionally, in an embodiment, the average measurement probability and/or the minimum measurement probability on the first carrier in the set are/is determined based on a measurement probability on the first carrier in each measurement gap in the set.

Optionally, in an embodiment, the measurement probability on the first carrier in each measurement gap in the set is determined based on a quantity of colliding carriers in each measurement gap in the set.

Optionally, in an embodiment, the maximum quantity of colliding carriers that collide with the first carrier in the set is determined based on a quantity of colliding carriers in each measurement gap in the set.

Optionally, in an embodiment, the quantity of colliding carriers includes a total quantity of carrier(s) that collide with the measurement window of the first carrier in one measurement gap in the set.

Optionally, in an embodiment, the collision includes: a part or all of the measurement window of the first carrier and a part or all of a measurement window of at least one carrier are in one measurement gap in the set.

Optionally, in an embodiment, the measurement window includes one or more of a start position of the measurement window, duration of the measurement window, and a period of the measurement window; and/or, the measurement gap includes one or more of a start position of the measurement gap, duration of the measurement gap, and a period of the measurement gap.

Optionally, in an embodiment, the measurement requirement on the first carrier is determined based on a first parameter of the first carrier, and the first parameter is determined based on the at least one of the average measurement probability on the first carrier, the minimum measurement probability on the first carrier, and the maximum quantity of colliding carriers that collide with the first carrier.

Optionally, in an embodiment, the first parameter is a reciprocal of the average measurement probability or a reciprocal of the minimum measurement probability on the first carrier.

Optionally, in an embodiment, the first parameter is the maximum quantity of colliding carriers that collide with the first carrier.

Optionally, in an embodiment, the measurement requirement is determined according to any one of the foregoing formulas (1) to (13).

Optionally, in an embodiment, the measurement window of the first carrier is a measurement window of a synchronization signal block SSB on the first carrier, and the measurement gap is a measurement gap used at least for the SSB on the first carrier.

It should be understood that the steps in the embodiments of the method 300 are similar to the corresponding steps in the embodiments of the method 200. For similar descriptions, refer to the descriptions of the method 200. To avoid repetition, details are not described herein again.

It should be further understood that in the embodiments of this application, the first, the second, and the like are merely used to indicate that a plurality of objects are different. For example, the first carrier and a second carrier are merely used to represent different carriers, and should not affect the carriers. The first, the second, and the like above should not impose any limitation on the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the method 200 and the method 300 may be unnecessary, some steps may be newly added, or any two or more of the foregoing embodiments may be combined. Such modified, changed, or combined solutions also fall within the scope of the embodiments of this application.

It should be further understood that, the foregoing descriptions of the embodiments of this application focus on differences between the embodiments. For same or similar parts that are not mentioned, refer to each other. For brevity, details are not described herein again.

It should be further understood that the sequence numbers of the foregoing processes do not mean execution sequences. The execution sequences of the processes should be determined based on functions and internal logic of the processes, and should not be construed as any limitation on the implementation processes of the embodiments of this application.

FIG. 12 is a schematic block diagram of a terminal device 400 according to an embodiment of this application. The terminal device 400 shown in FIG. 12 may be configured to perform the corresponding steps performed by the terminal device in FIG. 5, FIG. 6, FIG. 7, FIG. 8, FIG. 10, and the method 200. The terminal device embodiment and the method embodiment correspond to each other. For similar descriptions, refer to the method embodiment. The terminal device 400 includes a processor 410, a memory 420, and a transceiver 430. The processor 410, the memory 420, and the transceiver 430 are connected via a communications module. The memory 420 stores an instruction. The processor 410 is configured to execute the instruction stored in the memory 420. The transceiver 430 is configured to perform specific signal sending and receiving under driving of the processor 410.

The processor 410 is configured to determine a measurement requirement on a first carrier based on at least one of an average measurement probability on the first carrier, a minimum measurement probability on the first carrier, and a maximum quantity of colliding carriers that collide with the first carrier, where the at least one of the average measurement probability, the minimum measurement probability, and the maximum quantity of colliding carriers that collide with the first carrier is determined based on a measurement gap and a measurement window of the first carrier, and the measurement gap is a measurement gap used at least for the first carrier.

The processor 410 is further configured to perform measurement on the first carrier based on the measurement requirement.

According to the terminal device provided in this embodiment of this application, for each carrier on which measurement needs to be performed by the terminal device, a measurement requirement (a measurement counter) on the carrier on which measurement is to be performed is determined based on at least one of an average measurement probability on the carrier (the first carrier) on which measurement is to be performed, a minimum measurement probability on the carrier on which measurement is to be performed, and the maximum quantity of colliding carriers that collide with the first carrier. One or more of the average measurement probability, the minimum measurement probability, and the maximum quantity of colliding carriers that collide with the first carrier are determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. A measurement delay of the terminal device can be reduced on the basis that a measurement opportunity on each carrier is fully considered. In addition, a requirement on a measurement capability of the terminal device is prevented from being excessively high, costs of the terminal device are reduced, normal communication of the terminal device is ensured, and user experience is improved.

The components in the terminal device 400 are connected via a communications module. To be specific, the processor 410, the memory 420, and the transceiver 430 communicate with each other through an inner connection path, to transmit a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments may be implemented by using a hardware integrated logic circuit in the processor, or by using an instruction in a form of software. The processor may be a central processing unit (central processing unit, CPU), a network processor (network processor, NP), a combination of a CPU and an NP, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in this application. A general purpose processor may be a microprocessor, or the processor may be any conventional processor or the like. Steps of the methods disclosed with reference to this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Optionally, in another embodiment of this application, the at least one of the average measurement probability, the minimum measurement probability, and the maximum quantity of colliding carriers that collide with the first carrier is determined based on the measurement gap and a measurement window of each carrier in one or more carriers, the measurement gap is a measurement gap applied to the one or more carriers, and the one or more carriers include the first carrier.

Optionally, in another embodiment of this application, the processor 410 is further configured to: determine a set of one or more measurement gaps in which one or more measurement windows of the first carrier are located; and determine the at least one of the average measurement probability on the first carrier, the minimum measurement probability on the first carrier, and the maximum quantity of colliding carriers that collide with the first carrier in the set.

Optionally, in another embodiment of this application, the processor 410 is specifically configured to: determine a measurement probability on the first carrier in each measurement gap in the set; and determine the average measurement probability and/or the minimum measurement probability on the first carrier in the set based on the measurement probability on the first carrier in each measurement gap.

Optionally, in another embodiment of this application, the processor 410 is specifically configured to: determine a quantity of colliding carriers in each measurement gap in the set; and determine the measurement probability on the first carrier in each measurement gap in the set based on the quantity of colliding carriers in each measurement gap.

Optionally, in another embodiment of this application, the processor 410 is specifically configured to: determine a quantity of colliding carriers in each measurement gap in the set; and determine the maximum quantity of colliding carriers in the set based on the quantity of colliding carriers in each measurement gap.

Optionally, in another embodiment of this application, the quantity of colliding carriers includes a total quantity of carrier(s) that collide with the measurement window of the first carrier in one measurement gap in the set.

Optionally, in another embodiment of this application, the collision includes: a part or all of the measurement window of the first carrier and a part or all of a measurement window of at least one carrier are in one measurement gap in the set.

Optionally, in another embodiment of this application, the measurement window includes one or more of a start position of the measurement window, duration of the measurement window, and a period of the measurement window; and/or the measurement gap includes one or more of a start position of the measurement gap, duration of the measurement gap, and a period of the measurement gap.

Optionally, in another embodiment of this application, the processor 410 is specifically configured to: determine a first parameter of the first carrier based on the at least one of the average measurement probability on the first carrier, the minimum measurement probability on the first carrier, and the maximum quantity of colliding carriers that collide with the first carrier; and determine the measurement requirement based on the first parameter.

Optionally, in another embodiment of this application, the processor 410 is specifically configured to determine a reciprocal of the average measurement probability or a reciprocal of the minimum measurement probability on the first carrier as the first parameter.

Optionally, in another embodiment of this application, the processor 410 is specifically configured to determine the maximum quantity of colliding carriers that collide with the first carrier as the first parameter.

Optionally, in another embodiment of this application, the processor 410 is specifically configured to determine the measurement requirement according to the following formula:

$$S=\text{Max}(T1,T2)*\lceil R*A \rceil$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

Optionally, in another embodiment of this application, the processor 410 is specifically configured to determine the measurement requirement according to the following formula:

$$S=R*\text{Max}(T1,T2)*\lceil A \rceil$$

where S is a value of a measurement counter of the measurement requirement, R is a quantity of measurement opportunities that corresponds to the measurement requirement, T1 is the period of the measurement window, T2 is the period of the measurement gap, a value of Max(T1, T2) is a larger value of T1 and T2, and A is the first parameter.

Optionally, in another embodiment of this application, the processor 410 is specifically configured to determine the measurement requirement according to the following formula:

$$S=R*\text{Max}(T1,T2)*A$$

where S is a value of a measurement counter of the measurement requirement, R is a quantity of measurement opportunities that corresponds to the measurement requirement, T1 is the period of the measurement window, T2 is the period of the measurement gap, a value of Max(T, T2) is a larger value of T1 and T2, and A is the first parameter.

Optionally, in another embodiment of this application, the processor 410 is specifically configured to determine the measurement requirement according to the following formula:

$$S=\text{Max}(T1,T2)*\lceil R*A \rceil *C$$

where S is a value of a measurement counter of the measurement requirement, R is a quantity of measurement opportunities that corresponds to the measurement requirement. C is a constant, a value range of C is a positive integer greater than 0. T1 is the period of the measurement window, T2 is the period of the measurement gap, a value of Max(T1, T2) is a larger value of T1 and T2, and A is the first parameter.

Optionally, in another embodiment of this application, the processor 410 is specifically configured to determine the measurement requirement according to the following formula:

$$S=R*\text{Max}(T1,T2)*\lceil A \rceil *E$$

where S is a value of a measurement counter of the measurement requirement, R is a quantity of measurement opportunities that corresponds to the measurement requirement, E is a constant, a value range of E is a positive integer greater than 0, T is the period of the measurement window, T2 is the period of the measurement gap, a value of Max(T1, T2) is a larger value of T1 and T2, and A is the first parameter.

Optionally, in another embodiment of this application, the processor 410 is specifically configured to determine the measurement requirement according to the following formula:

$$S=R*\text{Max}(T1,T2)*A*N$$

where S is a value of a measurement counter of the measurement requirement, R is a quantity of measurement opportunities that corresponds to the measurement requirement, N is a constant, a value range of N is a positive integer greater than 0, T1 is the period of the measurement window, T2 is the period of the measurement gap, a value of Max(T1, T2) is a larger value of T1 and T2, and A is the first parameter.

Optionally, in another embodiment of this application, the processor 410 is specifically configured to determine the measurement requirement according to the following formula:

$$S=H*A$$

where S is a value of a measurement counter of the measurement requirement, H is a constant, a value range of H is a positive integer greater than 0, and A is the first parameter.

Optionally, in another embodiment of this application, the measurement window of the first carrier is a measurement window of a synchronization signal block SSB on the first carrier, and the measurement gap is a measurement gap used at least for the SSB on the first carrier.

Figure 13:
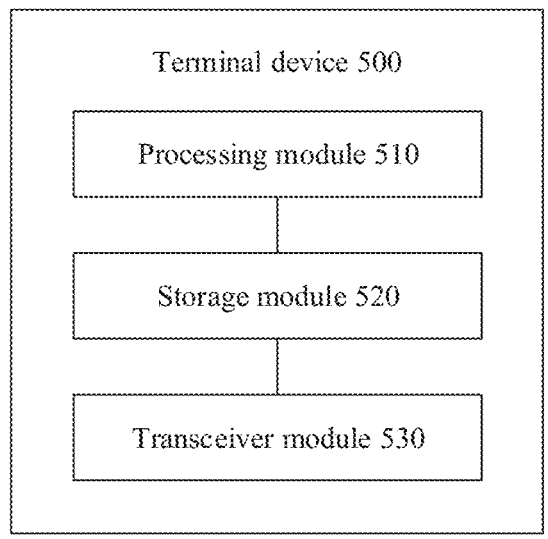
FIG. 13 is a schematic block diagram of a terminal device according to another embodiment of this application.

It should be noted that, in this embodiment of this application, the processor 410 may be implemented by a processing module, the memory 420 may be implemented by a storage module, and the transceiver 430 may be implemented by a transceiver module. As shown in FIG. 13, a terminal device 500 may include a processing module 510, a storage module 520, and a transceiver module 530.

The terminal device 400 shown in FIG. 12 or the terminal device 500 shown in FIG. 13 can implement the steps performed by the terminal device in FIG. 5, FIG. 6, FIG. 7, FIG. 8, FIG. 10, and the method 200. For similar descriptions, refer to the descriptions in the foregoing corresponding method. To avoid repetition, details are not described herein again.

Figure 14:
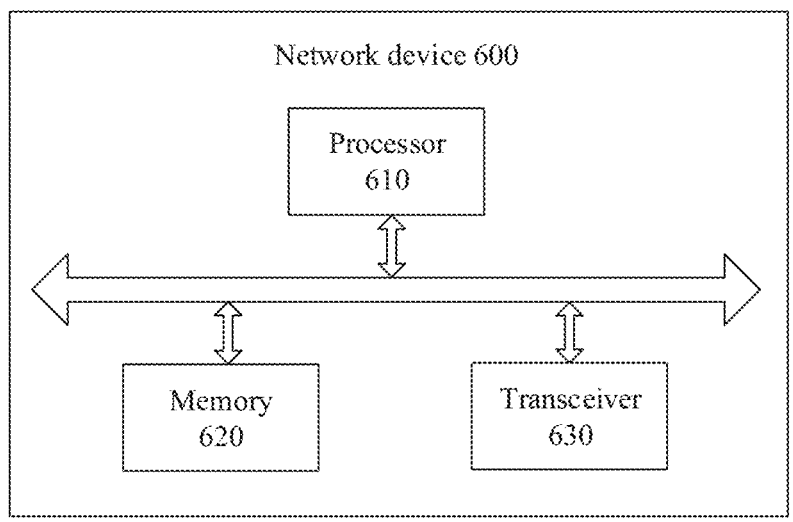
FIG. 14 is a schematic block diagram of a network device according to an embodiment of this application.

FIG. 14 is a schematic block diagram of a network device according to another embodiment of this application. The network device 600 shown in FIG. 14 may be configured to perform the corresponding steps performed by the network device in FIG. 11 and the method 300. The network device embodiment and the method embodiment correspond to each other. For similar descriptions, refer to the method embodiment. The network device 600 includes a processor 610, a memory 620, and a transceiver 630. The processor 610, the memory 620, and the transceiver 630 are connected via a communications module. The memory 620 stores an instruction. The processor 610 is configured to execute the instruction stored in the memory 620. The transceiver 630 is configured to perform specific signal sending and receiving under driving of the processor 610.

The transceiver 630 is configured to receive a measurement result on a first carrier, where the measurement result on the first carrier is determined based on a measurement requirement on the first carrier, where the measurement requirement on the first carrier is determined based on at least one of an average measurement probability on the first carrier, a minimum measurement probability on the first carrier, and a maximum quantity of colliding carriers that collide with the first carrier, one or more of the average measurement probability on the first carrier, the minimum measurement probability on the first carrier, and the maximum quantity of colliding carriers that collide with the first carrier are determined based on a measurement gap and a measurement window of the first carrier, and the measurement gap is a measurement gap used at least for the first carrier.

The processor 610 is configured to configure the first carrier based on the measurement result.

According to the network device provided in this application, for each carrier on which measurement is to be performed, a measurement requirement (a measurement counter) on the carrier on which measurement is to be performed is determined based on at least one of an average measurement probability on the carrier (the first carrier) on which measurement is to be performed, a minimum measurement probability on the carrier on which measurement is to be performed, and the maximum quantity of colliding carriers that collide with the first carrier. The at least one of the average measurement probability, the minimum measurement probability, and the maximum quantity of colliding carriers that collide with the first carrier is determined based on a measurement window of the carrier on which measurement is to be performed and a measurement gap. The measurement gap is the measurement gap used at least for the first carrier. In other words, in a process of determining the measurement requirement on the carrier on which measurement is to be performed, the measurement window configured for the carrier on which measurement is to be performed and the measurement gap related to the carrier on which measurement is to be performed are fully considered. Therefore, a measurement requirement corresponding to each carrier is determined based on an actual measurement status on the carrier, different carriers are processed in different manners, and fairness and competitiveness of measurement opportunities on different carriers are considered. The measurement result determined based on the measurement requirement can reflect a difference between carriers, so that the network device can more accurately configure different carriers based on measurement results on the different carriers, thereby improving communication efficiency and user experience.

The components in the network device 600 are connected via a communications module. To be specific, the processor 610, the memory 620, and the transceiver 630 communicate with each other through an inner connection path, to transmit a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments may be implemented by using a hardware integrated logic circuit in the processor, or by using an instruction in a form of software. The processor may be a CPU, a network processor NP, a combination of a CPU and an NP, a DSP, an ASIC, an FPGA or another programmable logic device, a discrete gate or a transistor logic device, or a discrete hardware component. The processor may implement or perform the methods, the steps, and logical block diagrams that are disclosed in this application. A general purpose processor may be a microprocessor, or the processor may be any conventional processor or the like. Steps of the methods disclosed with reference to this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

Optionally, in another embodiment of this application, the at least one of the average measurement probability, the minimum measurement probability, and the maximum quantity of colliding carriers that collide with the first carrier is determined based on the measurement gap and a measurement window of each carrier in one or more carriers, the measurement gap is a measurement gap applied to the one or more carriers, and the one or more carriers include the first carrier.

Optionally, in another embodiment of this application, the average measurement probability on the first carrier, the minimum measurement probability on the first carrier, and the maximum quantity of colliding carriers that collide with the first carrier are respectively an average measurement probability on the first carrier, a minimum measurement probability on the first carrier, and a maximum quantity of colliding carriers that collide with the first carrier in a set of one or more measurement gaps in which one or more measurement windows of the first carrier are located.

Optionally, in another embodiment of this application, the average measurement probability and/or the minimum measurement probability on the first carrier in the set are/is determined based on a measurement probability on the first carrier in each measurement gap in the set.

Optionally, in another embodiment of this application, the measurement probability on the first carrier in each measurement gap in the set is determined based on a quantity of colliding carriers in each measurement gap in the set.

Optionally, in another embodiment of this application, the maximum quantity of colliding carriers that collide with the first carrier in the set is determined based on a quantity of colliding carriers in each measurement gap in the set.

Optionally, in another embodiment of this application, the quantity of colliding carriers includes a total quantity of carrier(s) that collide with the measurement window of the first carrier in one measurement gap in the set.

Optionally, in another embodiment of this application, the collision includes: a part or all of the measurement window of the first carrier and a part or all of a measurement window of at least one carrier are in one measurement gap in the set.

Optionally, in another embodiment of this application, the measurement window includes one or more of a start position of the measurement window, duration of the measurement window, and a period of the measurement window; and/or, the measurement gap includes one or more of a start position of the measurement gap, duration of the measurement gap, and a period of the measurement gap.

Optionally, in another embodiment of this application, the measurement requirement on the first carrier is determined based on a first parameter of the first carrier, and the first parameter is determined based on the at least one of the average measurement probability on the first carrier, the minimum measurement probability on the first carrier, and the maximum quantity of colliding carriers that collide with the first carrier.

Optionally, in another embodiment of this application, the first parameter is a reciprocal of the average measurement probability or a reciprocal of the minimum measurement probability on the first carrier.

Optionally, in an embodiment, the first parameter is the maximum quantity of colliding carriers that collide with the first carrier.

Optionally, in another embodiment of this application, the measurement requirement is determined according to any one of the foregoing formulas (1) to (13).

Optionally, in another embodiment of this application, the measurement window of the first carrier is a measurement window of a synchronization signal block SSB on the first carrier, and the measurement gap is a measurement gap used at least for the SSB on the first carrier.

Figure 15:
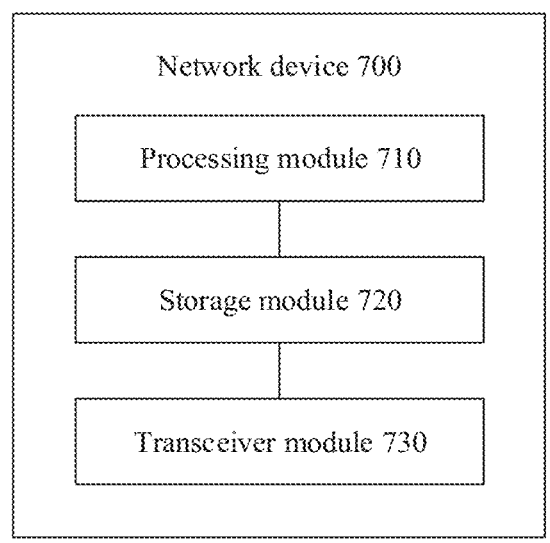
FIG. 15 is a schematic block diagram of a network device according to another embodiment of this application.

It should be noted that, in this embodiment of this application, the processor 610 may be implemented by a processing module, the memory 620 may be implemented by a storage module, and the transceiver 630 may be implemented by a transceiver module. As shown in FIG. 15, a network device 700 may include a processing module 710, a storage module 720, and a transceiver module 730.

The network device 600 shown in FIG. 14 or the network device 700 shown in FIG. 15 can implement the steps performed by the network device in FIG. 11 and the method 300. For similar descriptions, refer to the descriptions in the foregoing corresponding method. To avoid repetition, details are not described herein again.

An embodiment of this application further provides an apparatus, including a processor coupled to a memory, where the memory is configured to store an instruction, and the processor is configured to execute the instruction stored in the memory, to perform any method for measurement on a carrier that is provided in the embodiments of this application. According to the communications apparatus provided in this embodiment of this application, for each carrier on which measurement needs to be performed, a measurement requirement (a measurement counter) on the carrier on which measurement is to be performed is determined based on at least one of an average measurement probability on the carrier on which measurement is to be performed, a minimum measurement probability on the carrier on which measurement is to be performed, and a maximum quantity of colliding carriers of the carrier on which measurement is to be performed. The at least one of the average measurement probability, the minimum measurement probability, and the maximum quantity of colliding carriers is determined based on a measurement window of the carrier on which measurement is to be performed and a measurement gap. The measurement gap is a measurement gap used at least for the first carrier. Therefore, a measurement requirement corresponding to each carrier is determined based on an actual measurement status on the carrier, different carriers are processed in different manners, and fairness and competitiveness of measurement opportunities on different carriers are considered. A carrier measurement delay can be reduced on the basis that a measurement opportunity on each carrier is fully considered, thereby improving user experience. The processor and the memory may be decoupled, are separately disposed on different physical devices, and are connected in a wired or wireless manner to implement respective functions of the processor and the memory, to support the communications apparatus in implementing various functions in the foregoing embodiments. Alternatively, the processor and the memory may be coupled to a same device.

An embodiment of this application further provides an apparatus. The apparatus is configured to perform any method for measurement on a carrier that is provided in the embodiments of this application.

An embodiment of this application further provides an apparatus. The apparatus includes a processor, configured to execute a program in a memory, to implement any method for measurement on a carrier that is provided in the embodiments of this application.

An embodiment of this application further provides an apparatus, including a processor, where the processor is coupled to a memory; the memory is configured to store a computer program; and the processor is configured to execute the computer program stored in the memory, so that the apparatus performs any method for measurement on a carrier that is provided in the foregoing embodiments of this application.

An embodiment of this application further provides an apparatus, including a processor and a transceiver. The processor is configured to execute a computer program stored in a memory, so that the apparatus performs any method for measurement on a carrier that is provided in the foregoing embodiments of this application.

An embodiment of this application further provides an apparatus, including a processor, a memory, and a transceiver; the memory is configured to store a computer program; and the processor is configured to execute the computer program stored in the memory, so that the apparatus performs any method for measurement on a carrier that is provided in the foregoing embodiments of this application.

An embodiment of this application further provides an apparatus, including a unit or a means configured to perform the step of any method for measurement on a carrier that is provided in the foregoing embodiments of this application.

An embodiment of this application further provides a processor. The processor includes at least one circuit, configured to perform any method for measurement on a carrier that is provided in the foregoing embodiments of this application.

An embodiment of this application further provides a communications system. The communications system includes the terminal device and the network device that are provided in the foregoing embodiments of this application. The communications system may implement any method for measurement on a carrier that is provided in the embodiments of this application. Therefore, a measurement requirement corresponding to each carrier is determined based on an actual measurement status on the carrier, different carriers are processed in different manners, and fairness and competitiveness of measurement opportunities on different carriers are considered. A carrier measurement delay can be reduced on the basis that a measurement opportunity on each carrier is fully considered, thereby improving user experience.

An embodiment of this application further provides a computer-readable medium, configured to store computer program code. The computer program includes an instruction used to perform the method for measurement on a carrier in the embodiments of this application in the method 200 and the method 300. The computer readable medium may be a read-only memory (read-only memory, ROM) or a random access memory (random access memory, RAM). This is not limited in this embodiment of this application.

This application further provides a computer program product. The computer program product includes an instruction, and when the instruction is executed, the terminal device is enabled to perform a corresponding operation of the terminal device in the foregoing method.

An embodiment of this application further provides a system chip. The system chip includes a processing unit and a communications unit. The processing unit may be, for example, a processor, and the communications unit may be, for example, an input/output interface, a pin, or a circuit. The processing unit may execute a computer instruction, so that the chip in a communications apparatus performs any method for measurement on a carrier that is provided in the foregoing embodiments of this application.

Optionally, the computer instruction is stored in a storage unit.

Optionally, the storage unit is a storage unit inside the chip, such as a register or a cache. Alternatively, the storage unit may be a storage unit that is inside a terminal and that is located outside the chip, such as a ROM, another type of static storage device that can store static information and a static instruction, or a RAM. The processor mentioned in any of the foregoing descriptions may be a CPU, a microprocessor, an ASIC, or one or more integrated circuits configured to control execution of a program of the method for measurement on a carrier. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It should be understood that, the foregoing descriptions of the embodiments of this application focus on differences between the embodiments. For same or similar parts that are not mentioned, refer to each other. For brevity, details are not described herein again.

It should be understood that, the terms "and/or" and "at least one of A or B" in this specification describe only an association relationship for describing associated objects and represent that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory. ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for performing measurements on frequency carriers, comprising:
   determining, by a terminal device, a plurality of measurement gaps corresponding to a plurality of measurement windows that a frequency carrier is measured, wherein each of the plurality of measurement gaps indicates a length of time between two measurements of one or more frequency carriers comprising the frequency carrier and overlaps with a respective one of the plurality of measurement windows;

determining, by the terminal device and for each of the plurality of measurement gaps, a quantity of colliding carriers to obtain a plurality of quantities of colliding carriers corresponding to the plurality of measurement gaps, wherein the quantity of colliding carriers is a quantity of all frequency carriers that collide in a respective one of the plurality of measurement gaps;

determining, by the terminal device, a highest quantity in the determined plurality of quantities of colliding carriers as a maximum quantity of colliding carriers;

determining, by the terminal device, a measurement requirement on the frequency carrier based on the maximum quantity of colliding carriers; and performing, by the terminal device, measurement on the frequency carrier based on the measurement requirement.

2. The method according to claim 1, wherein the maximum quantity of colliding carriers is further determined based on a measurement window of each of the one or more frequency carriers.

3. The method according to claim 1, wherein the quantity of colliding carriers is a quantity of all frequency carriers with corresponding measurement windows that collide with each other in a corresponding measurement gap.

4. The method according to claim 3, wherein for each of the plurality of measurement gaps, all frequency carriers that collide in a respective one of the plurality of measurement gaps are all frequency carriers having at least a portion of their corresponding measurement windows located in the respective one of the plurality of measurement gaps.

5. The method according to claim 1, wherein the determining the measurement requirement comprises:
determining, by the terminal device, a parameter of the frequency carrier based on the maximum quantity of colliding carriers; and
determining, by the terminal device, the measurement requirement based on the parameter.

6. The method according to claim 5, wherein the determining the measurement requirement based on the parameter comprises:
determining the measurement requirement according to one of the following equations:

$S=\text{Max}(T1,T2)*[R*A]$ $S=R*\text{Max}(T1,T2)*[A]$ $S=R*\text{Max}(T1,T2)*A$ $S=\text{Max}(T1,T2)*[R*A]*C$ $S=R*\text{Max}(T1,T2)*[A]*E$ $S=R*\text{Max}(T1,T2)*A*N$ or $S=H*A;$ wherein S is a value of a measurement counter of the measurement requirement, R is a quantity of measurement opportunities that corresponds to the measurement requirement, T1 is a period of the measurement window, T2 is a period of the measurement gap, Max(T1, T2) is a larger value between T1 and T2, C, E, and N are coefficients notified by a network device, H is a constant, and A is the parameter.

7. The method of according to claim 1, wherein each of the plurality of measurement gaps is a predetermined time segment for measuring the one or more frequency carriers.

8. An apparatus, comprising:
at least one processor;
a memory coupled to the at least one processor and storing programming instructions for execution by the at least one processor, the programming instructions instruct the at least one processor to perform operations comprising:
determining a plurality of measurement gaps corresponding to a plurality of measurement windows that a frequency carrier is measured, wherein each of the plurality of measurement gaps indicates a length of time between two measurements of one or more frequency carriers comprising the frequency carrier and overlaps with a respective one of the plurality of measurement windows;
determining, for each of the plurality of measurement gaps, a quantity of colliding carriers to obtain a plurality of quantities of colliding carriers corresponding to the plurality of measurement gaps, wherein the quantity of colliding carriers is a quantity of all frequency carriers that collide in a respective one of the plurality of measurement gaps;
determining a highest quantity in the determined plurality of quantities of colliding carriers as a maximum quantity of colliding carriers;
determining a measurement requirement on the frequency carrier based on the maximum quantity of colliding carriers; and
performing measurement on the frequency carrier based on the measurement requirement.

9. The apparatus according to claim 8, wherein the maximum quantity of colliding carriers is further determined based on a measurement window of each of the one or more frequency carriers.

10. The apparatus according to claim 8, wherein the quantity of colliding carriers is a quantity of all frequency carriers with corresponding measurement windows that collide with each other in a respective one of the plurality of measurement gaps.

11. The apparatus according to claim 10, wherein for each of the plurality of measurement gaps, all frequency carriers that collide in a respective one of the plurality of measurement gaps are all frequency carriers having at least a portion of their corresponding measurement windows located in the respective one of the plurality of measurement gaps.

12. The apparatus according to claim 8, wherein the determining the measurement requirement comprises:
determining a parameter of the frequency carrier based on the maximum quantity of colliding carriers; and
determining the measurement requirement based on the parameter.

13. The apparatus according to claim 12, wherein the determining the measurement requirement based on the parameter comprises:
determining the measurement requirement according to one of the following equations:

$S=\text{Max}(T1,T2)*[R*A]$ $S=R*\text{Max}(T1,T2)*[A],$ $S=R*\text{Max}(T1,T2)*A$ $S=\text{Max}(T1,T2)*[R*A]*C$ $S = R*\text{Max}(T1,T2)*[A]*E$ $S = R*\text{Max}(T1,T2)*A*N$ or $S = H*A;$ wherein S is a value of a measurement counter of the measurement requirement, R is a quantity of measurement opportunities that corresponds to the measurement requirement, T1 is a period of the measurement window, T2 is a period of the measurement gap, Max (T1, T2) is a larger value between T1 and T2, C, E, and N are coefficients notified by a network device, H is a constant, and A is the parameter.

14. The apparatus according to claim 8, wherein each of the plurality of measurement gaps is a predetermined time segment for measuring the one or more frequency carriers.

15. An apparatus, comprising:
at least one processor; and
a memory coupled to the at least one processor and storing programming instructions for execution by the at least one processor, the programming instructions instruct the at least one processor to perform operations comprising:
receiving a measurement result on a frequency carrier, wherein the measurement result on the frequency carrier is determined based on a measurement requirement on the frequency carrier, wherein the measurement requirement on the frequency carrier is determined based on a maximum quantity of colliding carriers that collide with the frequency carrier, the maximum quantity of colliding carriers is determined as a highest quantity in a plurality of quantities of colliding carriers, wherein the plurality of quantity of colliding carriers correspond to a plurality of measurement gaps corresponding to a plurality of measurement windows that the frequency carrier is measured, wherein each of the plurality of measurement gaps indicates a length of time between two measurements of one or more frequency carriers comprising the frequency carrier and overlaps with a respective one of the plurality of measurement windows of the plurality of measurement windows, and wherein the quantity of colliding carriers is a quantity of all carriers that collide in a respective one of the plurality of measurement gaps; and
configuring the frequency carrier based on the measurement result.

16. The apparatus according to claim 15, wherein the maximum quantity of colliding carriers is further determined based on a measurement window of each of the one or more frequency carriers.

17. The apparatus according to claim 15, wherein the plurality of measurement windows of the frequency carrier are a plurality of measurement windows of a synchronization signal block (SSB) on the frequency carrier, and the plurality of measurement gaps are used at least for the SSB on the frequency carrier.

18. The apparatus according to claim 15, wherein each of the plurality of measurement gaps is a predetermined time segment for measuring the one or more frequency carriers.

* * * * *

UNITED STATES PATENT AND TRADEMARK OFFICE
CERTIFICATE OF CORRECTION

PATENT NO. : 12,369,055 B2  
APPLICATION NO. : 17/069318  
DATED : July 22, 2025  
INVENTOR(S) : Hong Li and Meng Zhang Page 1 of 2

It is certified that error appears in the above-identified patent and that said Letters Patent is hereby corrected as shown below:

In the Claims

In Column 55, In Line 47, In Claim 6, after "$S = Max(T1,T2) * [R * A]$" insert -- , --.

In Column 55, In Line 49, In Claim 6, after "$S = R * Max(T1,T2) * [A]$" insert -- , --.

In Column 55, In Line 51, In Claim 6, after "$S = R * Max(T1,T2) * A$" insert -- , --.

In Column 55, In Line 53, In Claim 6, after "$S = Max(T1,T2) * [R * A] * C$" insert -- , --.

In Column 55, In Line 55, In Claim 6, after "$S = R * Max(T1,T2) * [A] * E$" insert -- , --.

In Column 55, In Line 57, In Claim 6, after "$S = R * Max(T1,T2) * A * N$" insert -- , --.

In Column 55, In Line 66, In Claim 6, delete "His" and insert -- H is --.

In Column 56, In Line 1, In Claim 7, after "method" delete "of".

In Column 56, In Line 61, In Claim 13, after "$S = Max(T1,T2) * [R * A]$" insert -- , --.

In Column 56, In Line 65, In Claim 13, after "$S = R * Max(T1,T2) * A$" insert -- , --.

In Column 56, In Line 67, In Claim 13, after "$S = Max(T1,T2) * [R * A] * C$" insert -- , --.

In Column 57, In Line 1, In Claim 13, after "$S = R * Max(T1,T2) * [A] * E$" insert -- , --.

In Column 57, In Line 3, In Claim 13, after "$S = R * Max(T1,T2) * A * N$" insert -- , --.

In Column 57, In Line 13, In Claim 13, delete "His" and insert -- H is --.

In Column 58, In Line 10-12, In Claim 15, delete "plurality of measurement windows of the plurality Signed and Sealed this  
Twenty-third Day of December, 2025

John A. Squires  
*Director of the United States Patent and Trademark Office*

CERTIFICATE OF CORRECTION (continued)
U.S. Pat. No. 12,369,055 B2 of measurement windows," and insert -- plurality of measurement windows, --.